(12) United States Patent
Ahn et al.

(10) Patent No.: US 11,968,741 B2
(45) Date of Patent: Apr. 23, 2024

(54) METHOD AND DEVICE FOR SWITCHING AN IOT MODE IN WIRELESS COMMUNICATION SYSTEM

(71) Applicant: LG ELECTRONICS INC., Seoul (KR)

(72) Inventors: Joonkui Ahn, Seoul (KR); Hyunjung Choe, Seoul (KR); Changhwan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 400 days.

(21) Appl. No.: 17/291,720

(22) PCT Filed: Nov. 28, 2019

(86) PCT No.: PCT/KR2019/016624
§ 371 (c)(1),
(2) Date: May 6, 2021

(87) PCT Pub. No.: WO2020/111836
PCT Pub. Date: Jun. 4, 2020

(65) Prior Publication Data
US 2022/0132622 A1    Apr. 28, 2022

(30) Foreign Application Priority Data

Nov. 28, 2018 (KR) .................. 10-2018-0149748
Nov. 28, 2018 (KR) .................. 10-2018-0149780

(51) Int. Cl.
*H04W 4/00* (2018.01)
*H04L 1/00* (2006.01)
(Continued)

(52) U.S. Cl.
CPC ........... *H04W 76/30* (2018.02); *H04L 1/0025* (2013.01); *H04W 24/08* (2013.01); *H04W 68/005* (2013.01)

(58) Field of Classification Search
CPC .............................. H04W 76/30; H04L 1/0025
See application file for complete search history.

(56) References Cited

U.S. PATENT DOCUMENTS 11,064,555 B2 *  7/2021 Kim ..................... H04W 4/70
2014/0204908 A1   7/2014 Keller et al.
(Continued)

FOREIGN PATENT DOCUMENTS

KR         101175217        8/2012
KR       1020130034641      4/2013
(Continued)

OTHER PUBLICATIONS

PCT International Application No. PCT/KR2019/016624, International Search Report dated Mar. 17, 2020, 16 pages.
(Continued)

*Primary Examiner* — Chi H Pham
*Assistant Examiner* — Elisabeth Benoit Magloire
(74) *Attorney, Agent, or Firm* — LEE, HONG, DEGERMAN, KANG & WAIMEY

(57) ABSTRACT

A method and device for a wireless communication system according to one embodiment of the present invention receive a radio resource control (RRC) connection release message and release an RRC connection on the basis of the RRC connection release message, wherein the RRC connection release message includes information about a target Internet of Things (IoT) mode, and the communication device can be switched from a source IoT mode to the target IoT mode on the basis of the information about the target IoT mode.

11 Claims, 12 Drawing Sheets

(51) Int. Cl.
*H04W 24/08* (2009.01)
*H04W 68/00* (2009.01)
*H04W 76/30* (2018.01)

(56) References Cited

U.S. PATENT DOCUMENTS

| | | | | |
|---|---|---|---|---|
| 2018/0183832 A1* | 6/2018 | Chang | ................ | H04L 63/0428 |
| 2019/0053324 A1* | 2/2019 | Tseng | ................... | H04W 76/30 |
| 2019/0230564 A1* | 7/2019 | Kim | ...................... | H04W 76/34 |
| 2020/0245242 A1* | 7/2020 | Höglund | ........... | H04W 52/0216 |
| 2020/0351633 A1* | 11/2020 | Höglund | ............. | G06F 9/45558 |
| 2021/0168882 A1* | 6/2021 | Chang | ................... | H04W 76/11 |

FOREIGN PATENT DOCUMENTS

| | | | | |
|---|---|---|---|---|
| KR | 1020150099367 | 8/2015 | | |
| WO | WO-2018144722 A1 * | 8/2018 | .............. | G01S 5/02 |
| WO | WO-2018196522 A1 * | 11/2018 | .............. | H04L 1/18 |
| WO | WO-2018201451 A1 * | 11/2018 | ............ | H04W 36/00 |

OTHER PUBLICATIONS

Qualcomm Incorporated, "CN Type indication in RRC Connection Release Message," 3GPP TSG-RAN WG2 Meeting #103, R2-1812747, Aug. 2018, 8 pages.

\* cited by examiner

[Fig. 1]
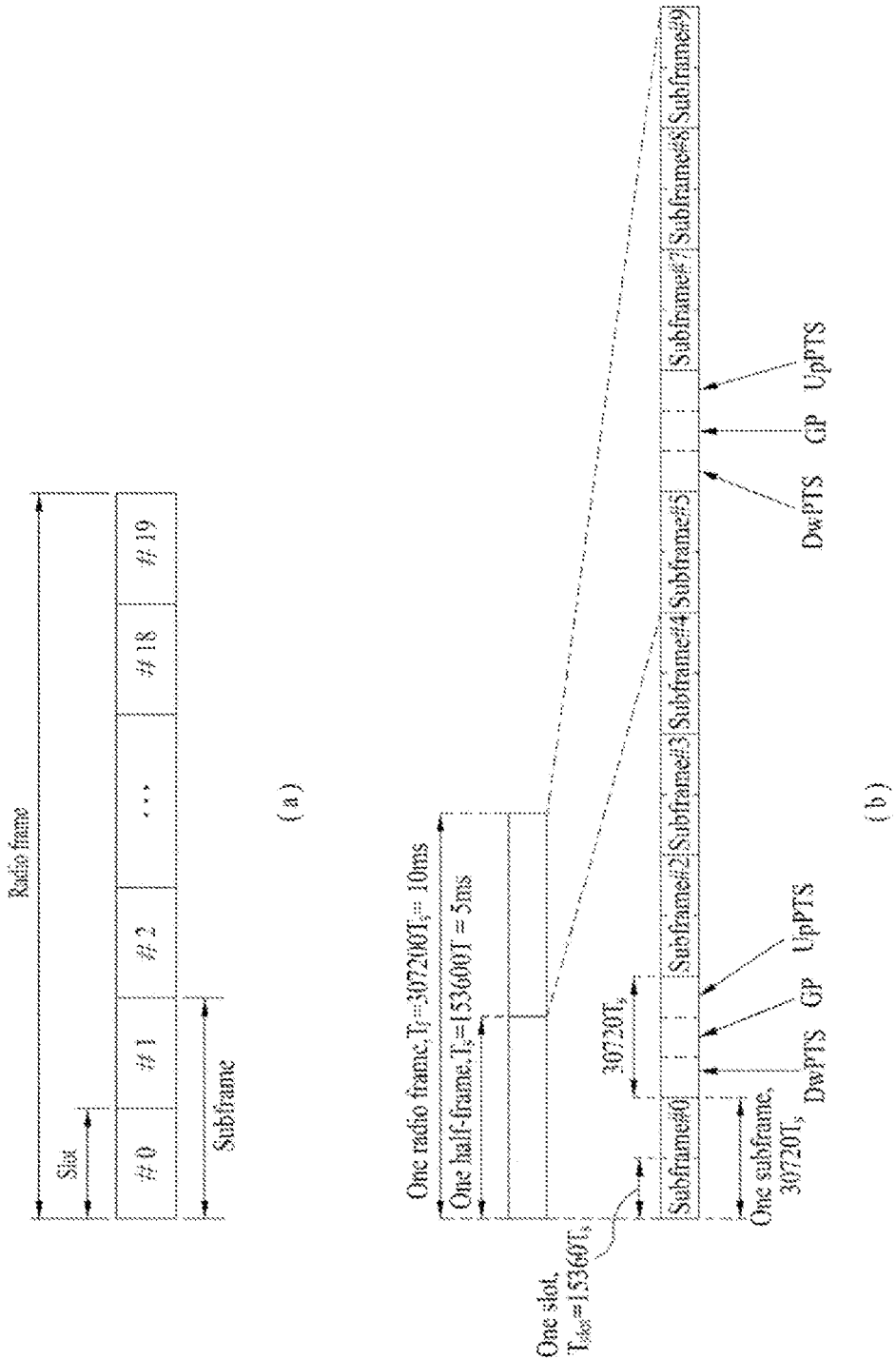

[Fig. 2]
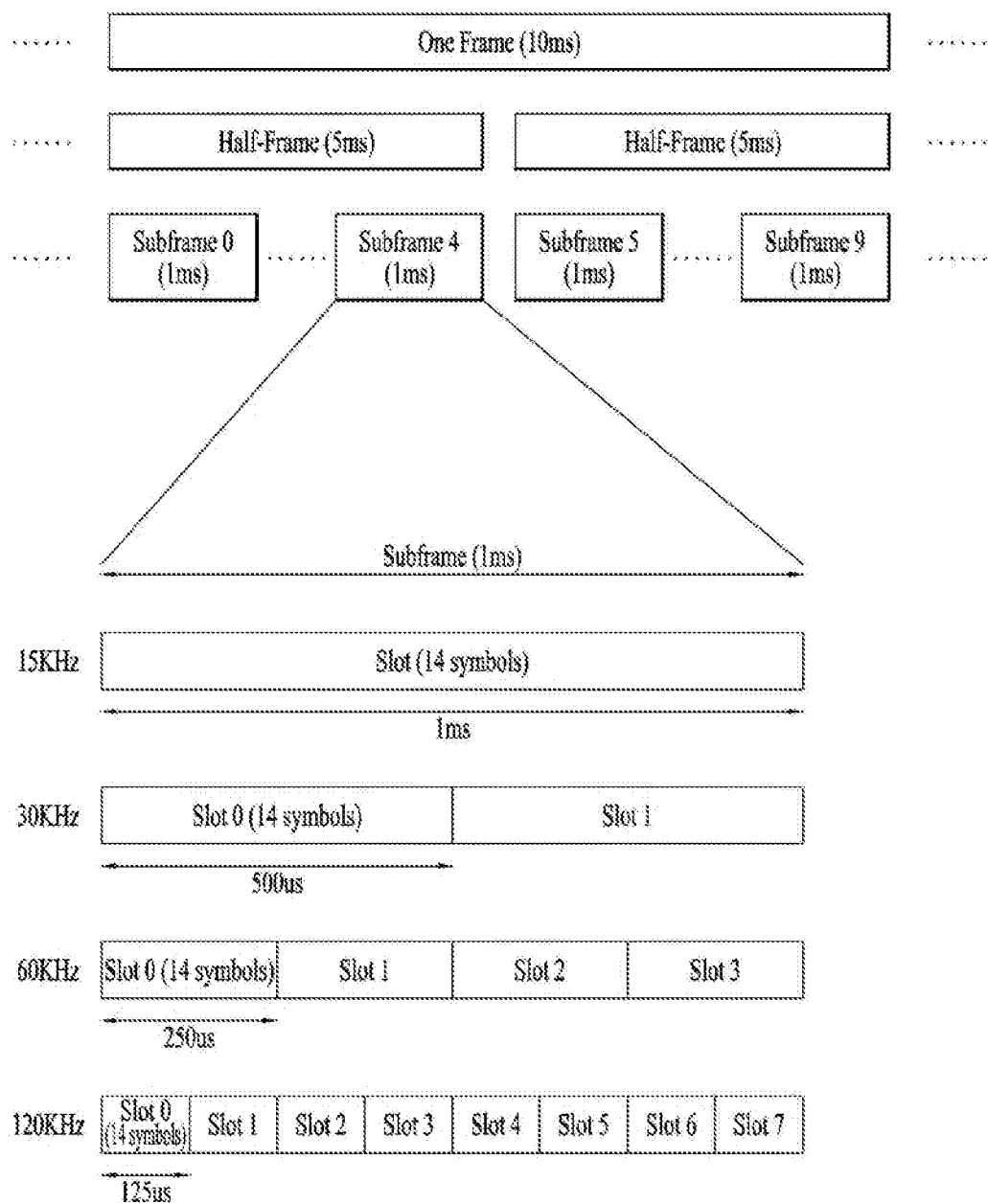

[Fig. 3]
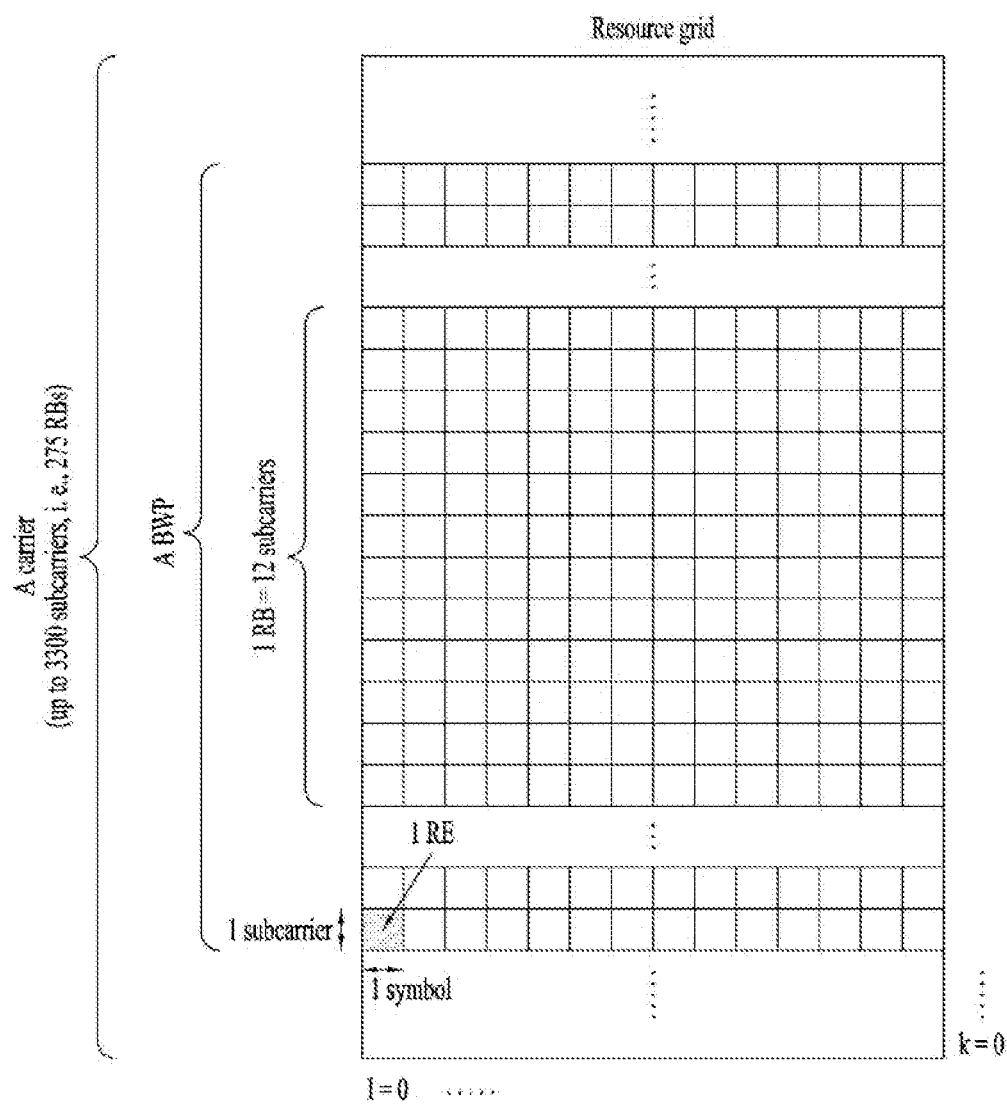

[Fig. 4]
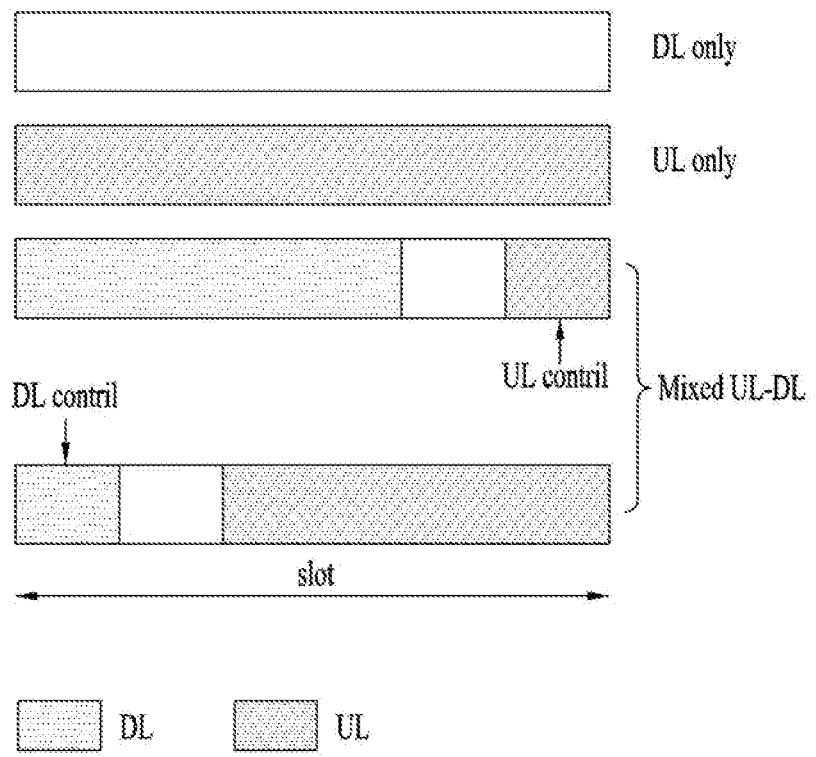

[Fig. 5]
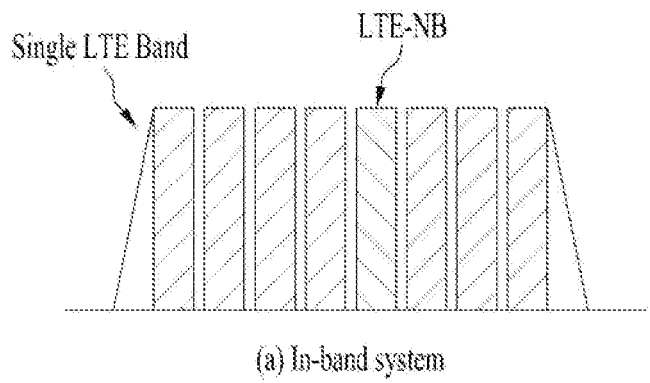
(a) In-band system
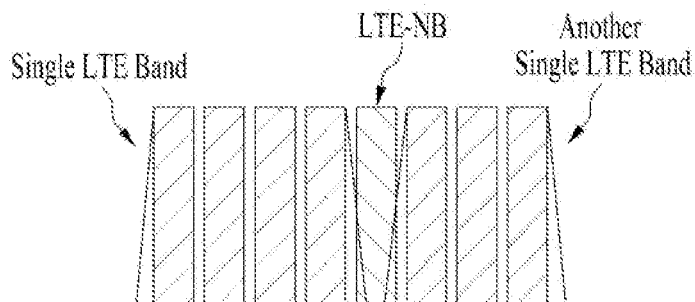
(b) Guard-band system
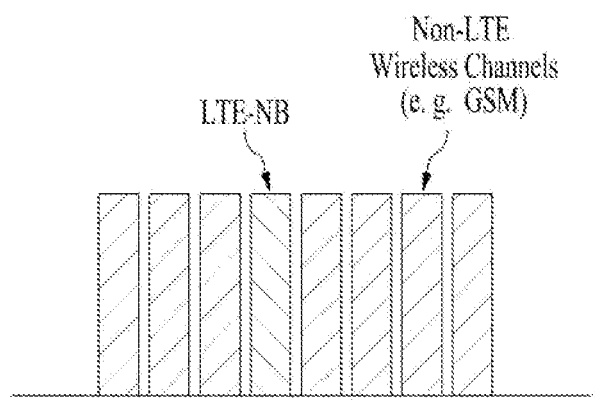
(c) Stand-alone system 【Fig. 6】
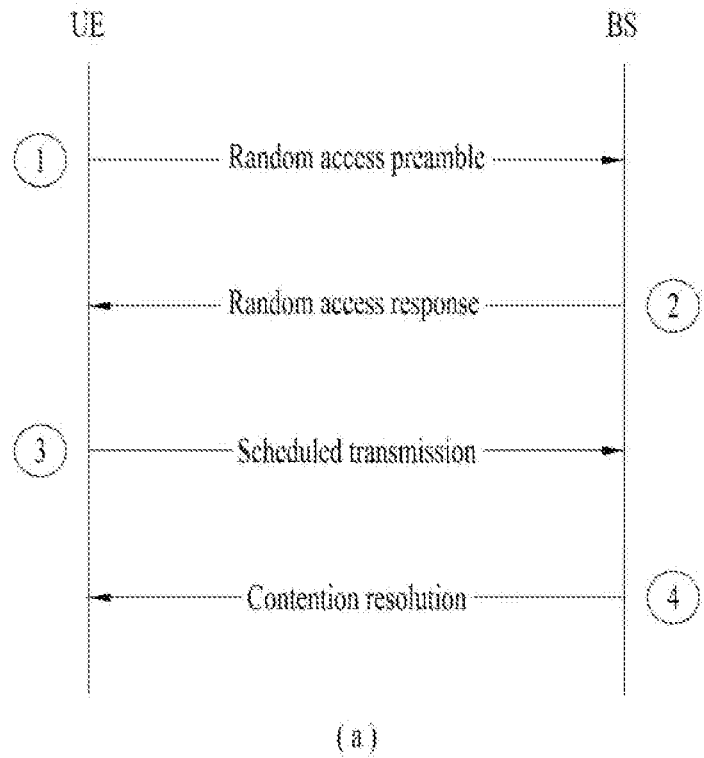
(a)
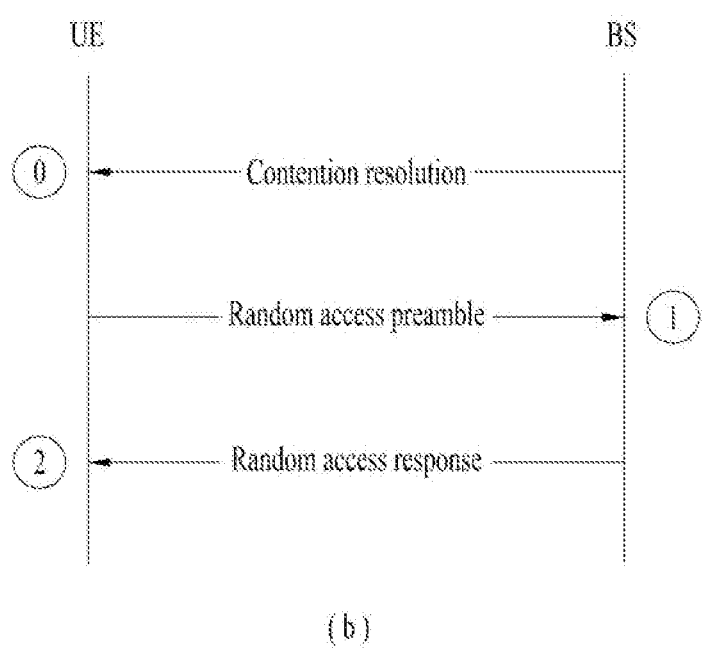
(b)

[Fig. 7]
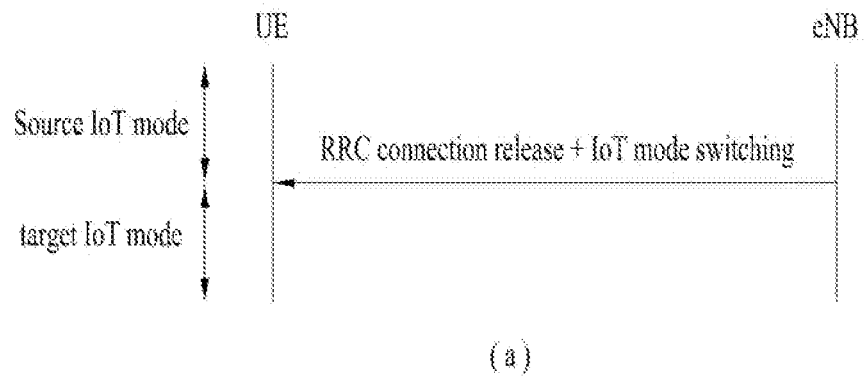
(a)
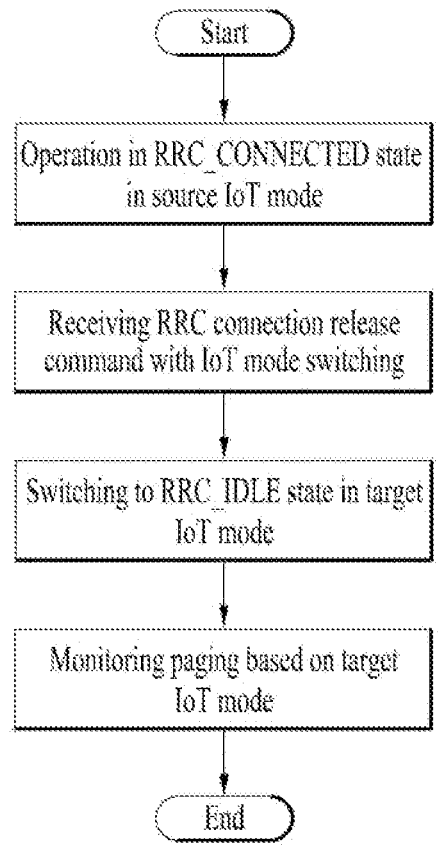
(b)

[Fig. 8]
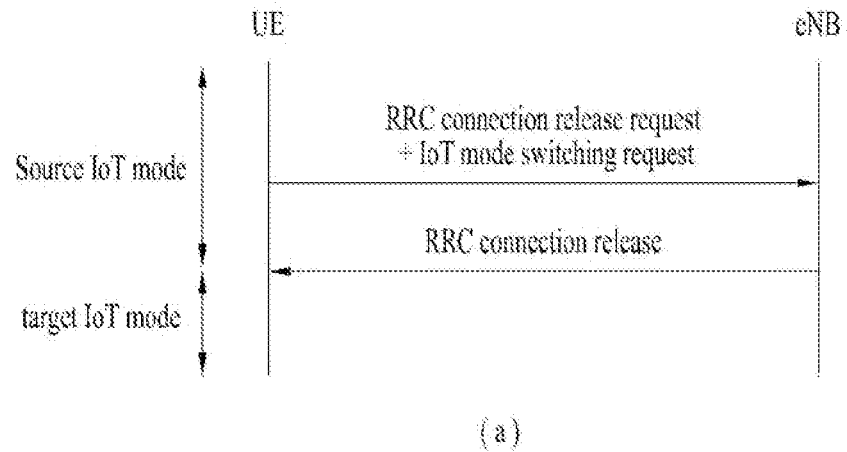
(a)
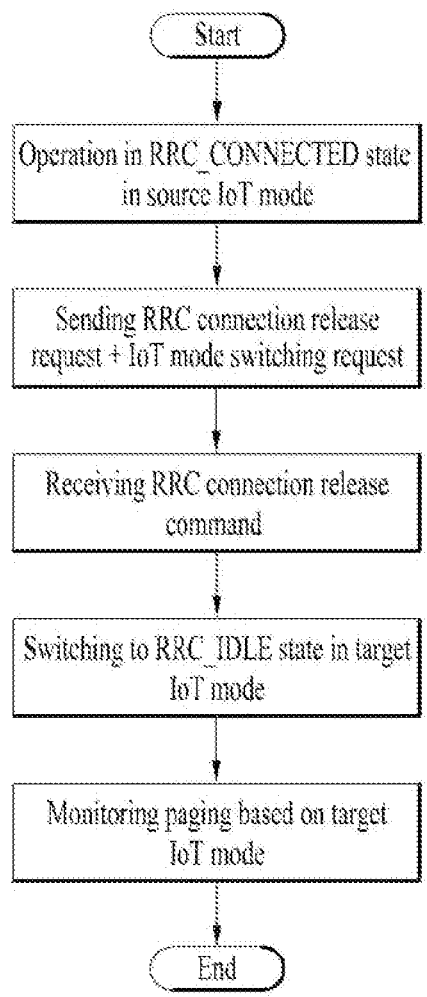
(b)

[Fig. 9]
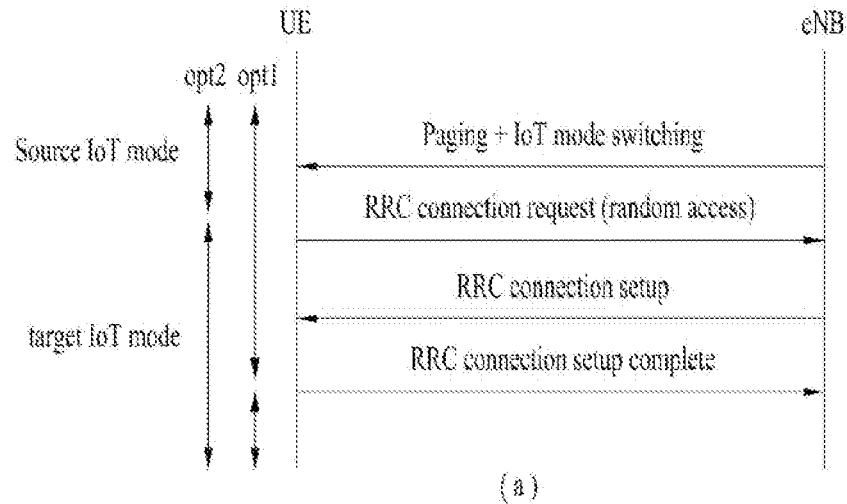
(a)
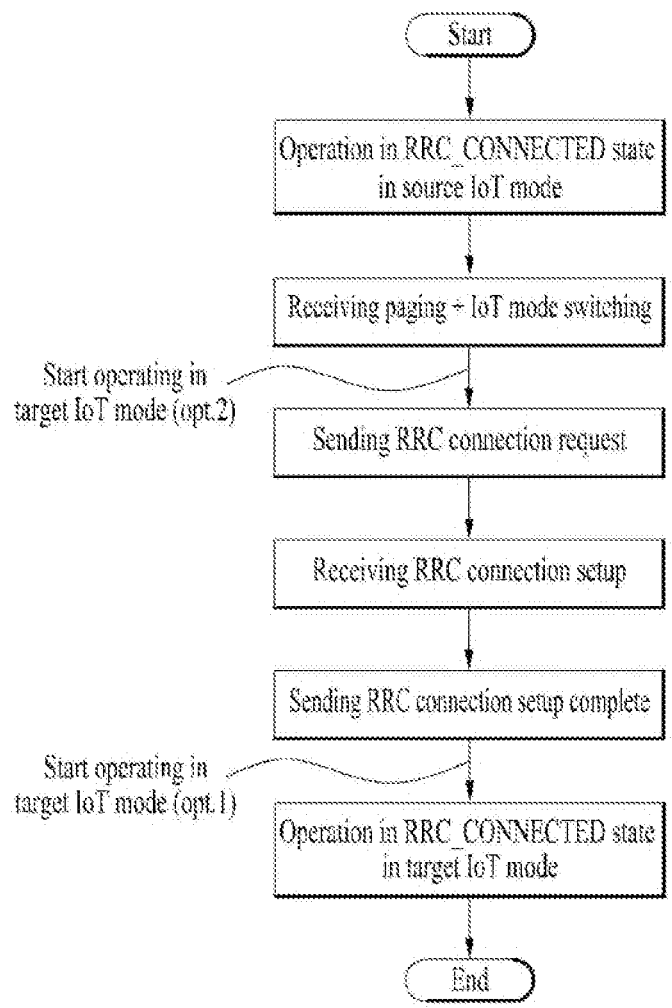
(b)

[Fig. 10]
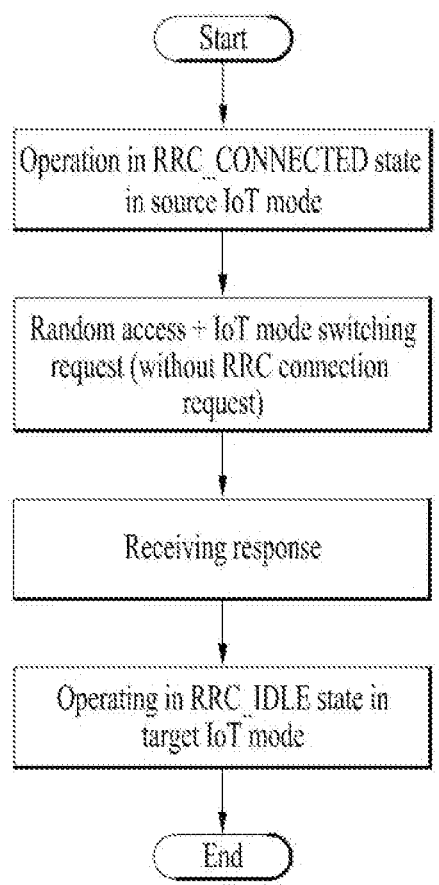
[Fig. 11]
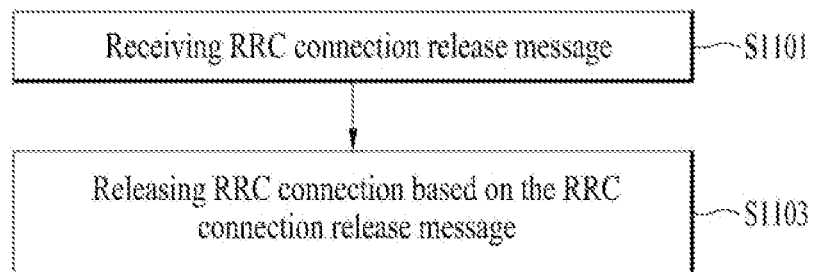

[Fig. 12]
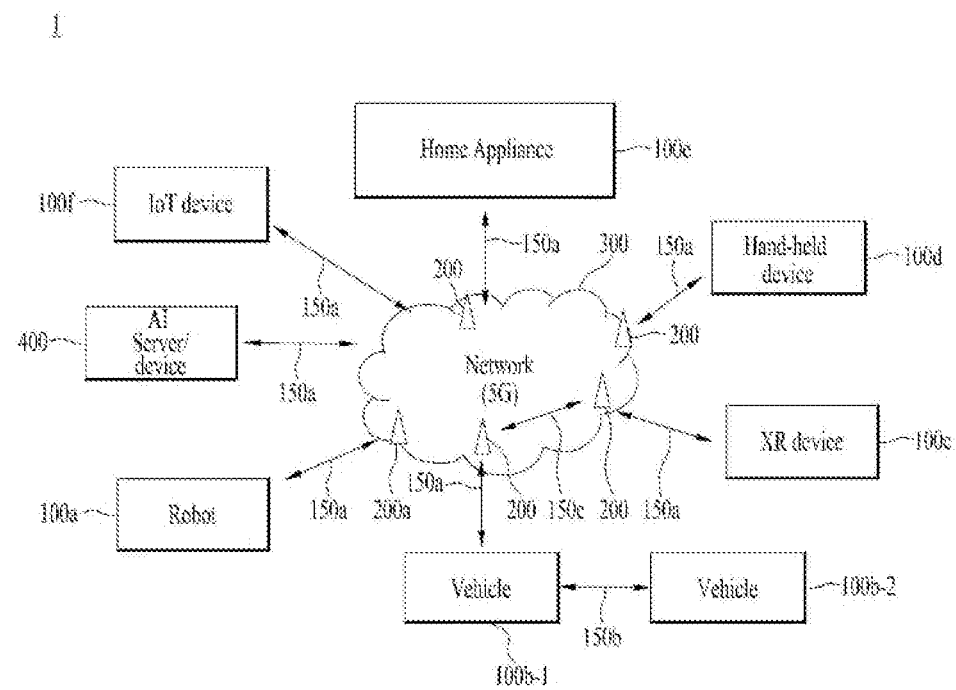
[Fig. 13]
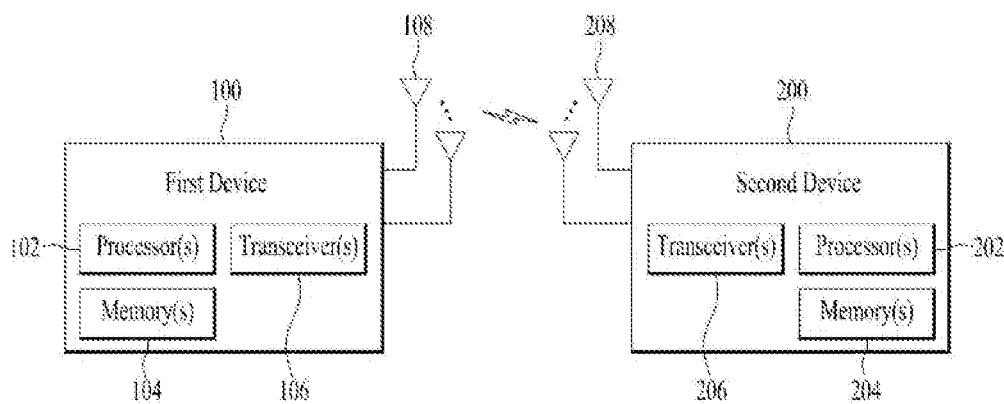

【Fig. 14】
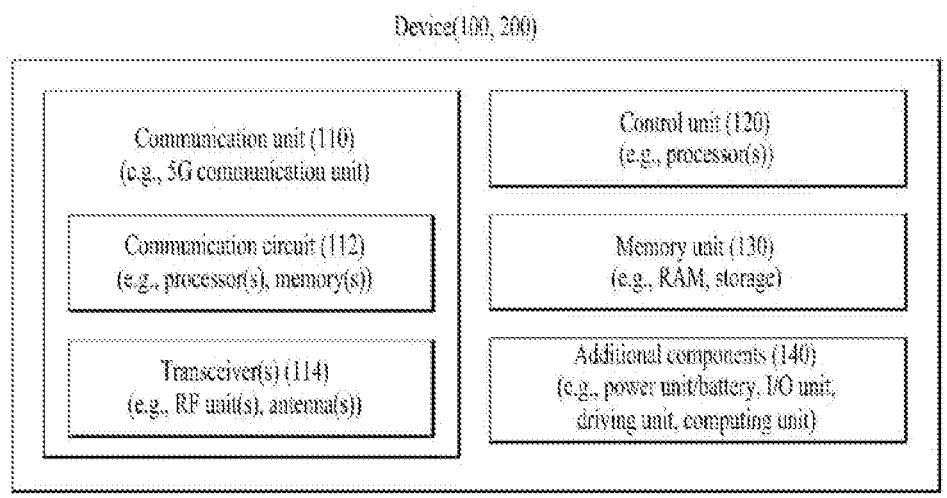
【Fig. 15】
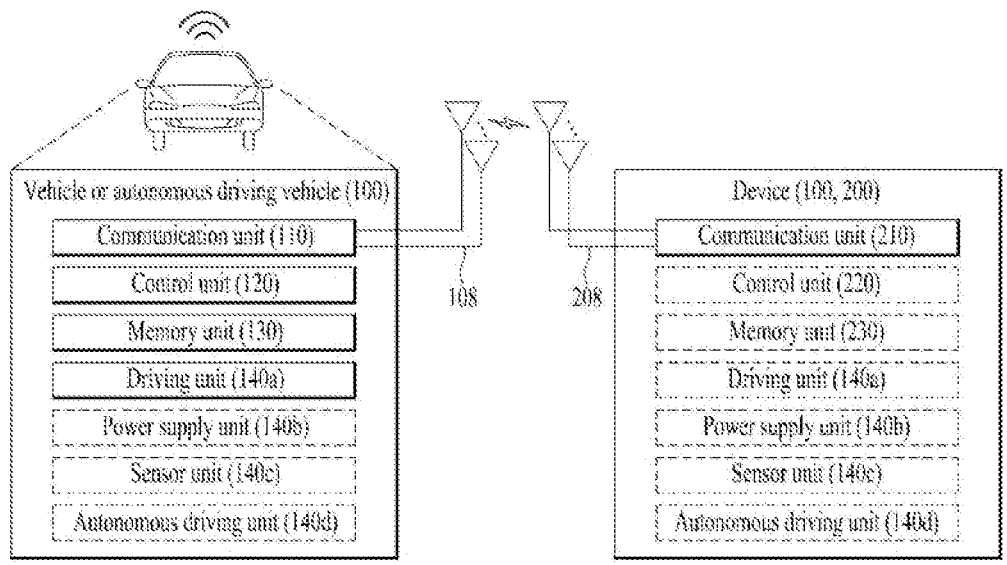

METHOD AND DEVICE FOR SWITCHING AN IOT MODE IN WIRELESS COMMUNICATION SYSTEM

CROSS-REFERENCE TO RELATED APPLICATIONS

This application is the National Stage filing under 35 U.S.C. 371 of International Application No. PCT/KR2019/016624, filed on Nov. 28, 2019, which claims the benefit of earlier filing date and right of priority to Korean Application Nos. 10-2018-0149748, filed on Nov. 28, 2018, and 10-2018-0149780, filed on Nov. 28, 2018, the contents of which are all hereby incorporated by reference herein in their entirety.

TECHNICAL FIELD

The present disclosure relates to a method and apparatus used in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of code division multiple access (CDMA) system, frequency division multiple access (FDMA) system, time division multiple access (TDMA) system, orthogonal frequency division multiple access (OFDMA) system, single carrier frequency division multiple access (SC-FDMA) system, and the like.

DISCLOSURE

Technical Problem

An aspect of the present disclosure is to provide a method and apparatus for supporting a plurality of Internet of things (IoT) modes.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

The present disclosure provides a method and apparatus operating in a wireless communication system.

According to one aspect of the present disclosure, a method performed by a communication device in a wireless communication system is provided. The method includes receiving a radio resource control (RRC) connection release message, and releasing an RRC connection based on the RRC connection release message. The RRC connection release message includes information about a target Internet of things (IoT) mode, and the communication device switches from a source IoT mode to the target IoT mode based on the information about the target IoT mode.

According to another aspect of the present disclosure, a communication device operating in a wireless communication system is provided. The communication device include at least one transceiver, at least one processor, and at least one memory operatively coupled to the at least one processor and storing instructions which when executed, cause the at least one processor to perform specific operations. The specific operations include receiving an RRC connection release message and releasing an RRC connection based on the RRC connection release message. The RRC connection release message includes information about a target IoT mode, and the communication device switches from a source IoT mode to the target IoT mode based on the information about the target IoT mode.

In the method or the device, the communication device may switch from the source IoT mode to the target IoT mode simultaneously with the release of the RRC connection or at a time within a predetermined period from a time when the RRC connection release message is received.

In the method or the device, the target IoT mode may be configured based on information about at least one preferred target IoT mode, and the information about the at least one preferred target IoT mode may be included in an RRC connection release request message transmitted by the communication device.

In the method or the device, the target IoT mode may be predetermined before the RRC connection release message is received.

In the method or the device, information about at least one parameter for operation in the target IoT mode may be received in an RRC configuration message before the release of the RRC connection and/or in the RRC connection release message.

In the method or the device, the communication device may monitor a paging message based on the target IoT mode after the release of the RRC connection.

In the method or the device, the communication device may test whether operation in the target IoT mode satisfies a predetermined condition, before the release of the RRC connection.

In the method or the device, the communication device may include an autonomous driving vehicle communicable with at least a user equipment (UE), a network, and another autonomous driving vehicle other than the communication device.

The above-described aspects of the present disclosure are only some of the preferred embodiments of the present disclosure, and various embodiments reflecting the technical features of the present disclosure may be derived and understood from the following detailed description of the present disclosure by those skilled in the art.

Advantageous Effects

According to an embodiment of the present disclosure, data delay and loss may be reduced by a method and apparatus for supporting a plurality of Internet of things (IoT) modes.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

FIGS. 1 and 2 illustrate a radio frame structure;

FIG. 3 illustrates a resource grid during the duration of a slot;

FIG. 4 illustrates a self-contained slot structure;

FIG. 5 illustrates bandwidths used in narrowband-Internet of things (NB-IoT);

FIG. 6 illustrates a random access procedure;

FIGS. 7 to 11 are flowcharts according to an embodiment of the present disclosure; and FIGS. 12 to 15 illustrate devices according to an embodiment of the present disclosure.

BEST MODE

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

For clarity of description, the present disclosure will be described in the context of a 3GPP communication system (e.g., LTE and NR), which should not be construed as limiting the spirit of the present disclosure. LTE refers to a technology beyond 3GPP TS 36.xxx Release 8. Specifically, the LTE technology beyond 3GPP TS 36.xxx Release 10 is called LTE-A, and the LTE technology beyond 3GPP TS 36.xxx Release 13 is called LTE-A pro. 3GPP NR is the technology beyond 3GPP TS 38.xxx Release 15. LTE/NR may be referred to as a 3GPP system. "xxx" specifies a technical specification number. LTE/NR may be generically referred to as a 3GPP system. For the background technology, terminologies, abbreviations, and so on as used herein, refer to technical specifications published before the present disclosure. For example, the following documents may be referred to.

3GPP LTE
36.211: Physical channels and modulation
36.212: Multiplexing and channel coding
36.213: Physical layer procedures
36.300: Overall description
36.331: Radio Resource Control (RRC)

3GPP NR
38.211: Physical channels and modulation
38.212: Multiplexing and channel coding
38.213: Physical layer procedures for control
38.214: Physical layer procedures for data
38.300: NR and NG-RAN Overall Description
38.331: Radio Resource Control (RRC) protocol specification FIG. 1 illustrates a radio frame structure used for LTE.

FIG. 1(a) illustrates frame structure type 1. Frame structure type 1 is applicable to both a full Frequency Division Duplex (FDD) system and a half FDD system.

One radio frame is 10 ms (Tf=307200·Ts) long, including equal-sized 20 slots indexed from 0 to 19. Each slot is 0.5 ms (Tslot=15360·Ts) long. One subframe includes two successive slots. An ith subframe includes 2ith and (2i+1)th slots. That is, a radio frame includes 10 subframes. A time required for transmitting one subframe is defined as a Transmission Time Interval (TTI). Ts is a sampling time given as Ts=1/(15 kHz×2048)=3.2552×10-8 (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 1(b) illustrates frame structure type 2. Frame structure type 2 is applied to a Time Division Duplex (TDD) system. One radio frame is 10 ms (Tf=307200·Ts) long, including two half-frames each having a length of 5 ms (=153600·Ts) long. Each half-frame includes five subframes each being 1 ms (=30720·Ts) long. An ith subframe includes 2ith and (2i+1)th slots each having a length of 0.5 ms (Tslot=15360·Ts). Ts is a sampling time given as Ts=1/(15 kHz×2048)=3.2552×10-8 (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

Table 1 below lists special subframe configurations (DwPTS/GP/UpPTS lengths).

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

FIG. 2 illustrates a radio frame structure used for NR.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 2 exemplarily illustrates that the number of symbols per slot, the number of slots per frame, and the number of slots per subframe vary according to SCSs in a normal CP case.

TABLE 2

| SCS (15*2^u) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

\*$N^{slot}_{symb}$: number of symbols in a slot
\*$N^{frame, u}_{slot}$: number of slots in a frame
\*$N^{subframe, u}_{slot}$: number of slots in a subframe Table 3 illustrates that the number of symbols per slot, the number of slots per frame, and the number of slots per subframe vary according to SCSs in an extended CP case.

TABLE 3

| SCS (15*2^u) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

FIG. 3 illustrates a resource grid during the duration of one slot.

A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

FIG. 4 illustrates a structure of a self-contained slot.

In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. The GP provides a time gap in the process of the UE switching from the transmission mode to the reception mode or from the reception mode to the transmission mode. Some symbols at the time of switching from DL to UL within a subframe may be configured as the GP.

Machine Type Communication (MTC)

Machine type communication (MTC) is an application that does not require a large throughput, which is applicable to machine-to-machine (M2M) or Internet of things (IoT). The 3GPP adopts MTC as a communication technology to meet the requirements of IoT service.

MTC may be implemented to satisfy the criteria of (i) low cost and low complexity, (ii) enhanced coverage, and (iii) low power consumption.

The 3GPP has applied MTC since Release 10, and the features of MTC added to each 3GPP release will be described in brief.

3GPP Release 10 and Release 11 specify load control methods in MTC.

The load control methods aim to prevent IoT (or M2M) devices from suddenly imposing load on a BS.

More specifically, Release 10 relates to a method of controlling load by disconnecting IoT devices from a BS, when the BS is overloaded, whereas Release 11 relates to a method of indicating to UEs to access later by broadcasting a signal such as system information block type 14 (SIB14) and thus barring UE access in advance.

Release 12 added features for low-cost MTC and newly defined UE Category 0 for this purpose. UE Category is an index indicating how much data a UE is capable of processing in a communication modem.

That is, a Category 0 UE uses a reduced peak data rate, a half-duplex operation with relaxed radio frequency (RF) requirements, and a single reception antenna. Therefore, the baseband and RF complexities of the UE are reduced.

Release 13 introduced enhanced MTC (eMTC) which allows a UE to operate only in the minimum frequency bandwidth of 1.08 MHz supported in legacy LTE in order to further reduce cost and power consumption.

While the following description focuses on features related to eMTC, the same thing may be applied to MTC, eMTC, and MTC to be applied to 5th generation (5G) (or new radio (NR)), unless otherwise specified. For convenience of description, they will be collectively referred to as MTC.

Therefore, MTC is interchangeably used with other terms such as eMTC, LTE-M1/M2, bandwidth reduced low complexity (BL)/coverage enhancement (CE), non-BL UE (in enhanced coverage), NR MTC, and enhanced BL/CE. That is, MTC may be replaced with a term to be defined in the future 3GPP standard.

(1) MTC operates only in a specific system bandwidth (or channel bandwidth).

The specific system bandwidth may be 6 RBs of legacy LTE, as shown in Table 4 below. The specific system bandwidth may be defined in consideration of NR frequency ranges and NR subcarrier spacings (SCSs) as defined in Tables 5, 6 and 7. The specific system bandwidth may be represented as a narrowband (NB). For reference, legacy LTE refers to a part other than MTC, described in the 3GPP standards. Preferably, MTC may operate in RBs corresponding to the lowest system bandwidths listed in Tables 6 and 7 below in NR as in legacy LTE. Alternatively, MTC may operate in at least one bandwidth part (BWP) or a specific band of the BWP in NR.

TABLE 4

| | Channel bandwidth BWChannel [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

Table 5 lists frequency ranges (FRs) defined in NR.

TABLE 5

| Frequency range designation | Corresponding frequency range |
|---|---|
| FR1 | 450 MHz-6000 MHz |
| FR2 | 24250 MHz-52600 MHz |

Table 6 lists exemplary maximum transmission bandwidth configurations (NRBs) for channel bandwidths and SCSs in FR1.

TABLE 6

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 7 lists exemplary maximum transmission bandwidth configurations (NRBs) for channel bandwidths and SCSs in FR2.

TABLE 7

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

(2) MTC operates in half-duplex mode and uses limited (or decreased) maximum transmission power.

(3) MTC does not use a channel (defined in legacy LTE or NR) which should be distributed across the total system bandwidth of legacy LTE or NR.

For example, the legacy LTE channels, PCFICH, PHICH, and PDCCH are not used in MTC.

Accordingly, a new control channel, MTC PDCCH (MPDCCH) is defined for MTC because the above channels are not monitored.

The MPDCCH occupies up to 6 RBs in the frequency domain and one subframe in the time domain.

The MPDCCH is similar to the enhanced PDCCH (EPDCCH) and additionally supports a common search space for paging and random access.

In concept, the MPDCCH is close to the EPDCCH used in legacy LTE.

(4) MTC uses new defined DCI formats, for example, DCI formats 6-0A, 6-0B, 6-1A, 6-1B, and 6-2.

(5) In MTC, the physical broadcast channel (PBCH), the physical random access channel (PRACH), the MPDCCH, the physical downlink shared channel (PDSCH), the physical uplink control channel (PUCCH), and the physical uplink shared channel (PUSCH) may be repeatedly transmitted. These MTC repeated transmissions may enable decoding of the MTC channels even in a very poor signal quality or power condition such as a basement, thereby bringing about the effects of an increased cell radius and signal penetration.

(6) In MTC, hybrid automatic repeat request (HARD) retransmission is adaptive and asynchronous, and is based on a new scheduling assignment received on the MPDCCH.

(7) In MTC, PDSCH scheduling (downlink control information (DCI)) and PDSCH transmission take place in different subframes (cross-subframe scheduling).

(8) All resource allocation information (a subframe, a transport block size (TBS), and a subband index) for system information block type 1 (SIB1) decoding is determined based on a parameter in a master information block (MIB), and any control channel is not used for the SIB1 decoding in MTC.

(9) All resource allocation information (a subframe, a TBS, and a subband index) for system information block type 2 (SIB2) decoding is determined by several SIB1 parameters, and any control channel is not used for the SIB2 decoding in MTC.

(10) MTC supports an extended paging (discontinuous reception (DRX)) cycle.

(11) MTC may use the same primary synchronization signal (PSS)/secondary synchronization signal (SSS)/common reference signal (CRS) as used in legacy LTE or NR. In NR, the PSS/SSS may be transmitted in units of an SS block (SS/PBCH block or SSB), and a tracking RS (TRS) may be used for the same purpose as the CRS. That is, the TRS is a cell-specific RS, which may be used for frequency/time tracking.

Now, a description will be given of MTC operation modes and levels. For coverage enhancement, two operations modes (a first mode and a second mode) and four different levels are defined in MTC, as listed in Table 8 below.

The MTC operation modes may be referred to as CE Modes. In this case, the first mode and the second mode may be referred to as CE Mode A and CE Mode B, respectively.

TABLE 8

| Mode | Level | Description |
| --- | --- | --- |
| Mode A | Level 1 | No repetition for PRACH |
| | Level 2 | Small Number of Repetition for PRACH |
| Mode B | Level 3 | Medium Number of Repetition for PRACH |
| | Level 4 | Large Number of Repetition of PRACH |

The first mode targets modest coverage enhancement supporting full mobility and channel state information (CSI) feedback. The first mode is characterized by no repetition or a small number of repetitions. The first mode may have an equivalent operation range to that of UE Category 1. The second mode is defined for a UE in a very poor coverage condition, supporting CSI feedback and limited mobility. In the second mode, a large number of repeated transmissions are defined. The second mode provides up to 15-dB coverage enhancement with respect to the coverage of UE Category 1. Each level of MTC is defined differently for an RACH procedure and a paging procedure.

A method of determining an MTC operation mode and level will be described below.

An MTC operation mode is determined by a BS, and a level is determined by an MTC UE. Specifically, the BS transmits RRC signaling including information about the MTC operation mode to the UE. The RRC signaling may be an RRC connection setup message, an RRC connection reconfiguration message, or an RRC connection reestablishment message. The term "message" may be referred to as an information element (IE).

The MTC UE then determines a level within the operation mode and indicates the determined level to the BS. Specifically, the MTC UE determines the level within the operation mode based on measured channel quality (e.g., reference signal received power (RSRP), reference signal received quality (RSRQ), signal to interference and noise ratio (SINR), or the like) and indicates the determined level to the BS by using a PRACH resource (e.g., frequency, time, and a preamble).

During a general MTC signal transmission and reception procedure, the MTC UE may transition to an idle state (e.g., RRC_IDLE state) and/or an inactive state (e.g., RRC_INACTIVE state) to reduce power consumption. The MTC UE may be configured with DRX in the idle state and/or the inactive state. For example, the idle-state and/or inactive-state MTC UE may be configured to monitor an MPDCCH related to paging only in a specific subframe (frame or slot) according to a DRX cycle set by the BS or the like. The MPDCCH related to paging may be an MPDCCH scrambled with a paging access-radio network temporary identifier (P-RNTI).

Narrowband-Internet of Things (NB-IoT)

NB-IoT may refer to a system designed to support low complexity and low power consumption in a system bandwidth (BW) corresponding to one physical resource block (PRB) of a wireless communication system (e.g., the LTE or NR system)

NB-IoT may be referred to as other terms such as NB-LTE, NB-IoT enhancement, enhanced NB-IoT, further enhanced NB-IoT, NB-NR, and so on. That is, NB-IoT may be replaced with a term which was defined or will be defined in the 3GPP standards. For convenience of description, these terms will be collectively expressed as "NB-IoT".

NB-IoT may be mainly used as a communication scheme for implementing IoT (i.e., Internet of things) by supporting devices (or UEs) such as MTC devices (or UEs) in a cellular system. Further, the NB-IoT system adopts the same OFDM parameters such as SCS as used in the legacy wireless communication systems (e.g., 3GPP, LTE, and NR systems), thus obviating the need for allocating an additional band. As one PRB of a legacy system band is allocated for NB-IoT, frequency may be efficiently used. Further, since each UE perceives a single PRB as a carrier in NB-IoT, a PRB and a carrier described in the present disclosure may be interpreted as the same meaning.

While frame structures, physical channels, multi-carrier operations, operation modes, and general signal transmission/reception are described in relation to NB-IoT in the context of the legacy LTE system in the present disclosure, they may be extended to a next-generation system (e.g., NR system). The content related to NB-IoT in the present disclosure may also be extended to MTC targeting similar technical purposes (e.g., low power, low cost, and coverage enhancement).

A BS and/or UE supporting NB-IoT may be configured to transmit and receive physical channels and/or physical signals configured separately from those of the legacy system.

A detailed description will be given of physical channels and/or physical signals supported in NB-IoT.

DL of the NB-IoT system will first be described. OFDMA may be applied to the NB-IoT DL based on an SCS of 15 kHz. As OFDMA provides orthogonality between subcarriers, co-existence with the legacy systems (e.g., LTE and NR systems) may be efficiently supported.

Physical channels of the NB-IoT system may be named by adding 'N (Narrowband)' to the names of the counterparts of the legacy system to make distinction between the NB-IoT physical channels and the legacy physical channels. For example, the defined DL physical channels include narrowband physical broadcast channel (NPBCH), narrowband physical downlink control channel (NPDCCH)/narrowband enhanced physical downlink control channel (NEPDCCH), narrowband physical downlink shared channel (NPDSCH), and so on. The defined DL physical signals of the NB-IoT system may include narrowband primary synchronization signal (NPSS), narrowband secondary synchronization signal (NSSS), narrowband reference signal (NRS), narrowband positioning reference signal (NPRS), narrowband wake up signal (NWUS), and so on.

In general, the above-described NB-IoT physical channels and physical signals may be configured to be transmitted through time-domain multiplexing and/or frequency-domain multiplexing.

Characteristically, the NB-IoT DL channels, NPBCH, NPDCCH, and NPDSCH may be repeatedly transmitted for coverage enhancement.

Further, NB-IoT uses newly defined DCI formats. For example, the DCI formats for NB-IoT may include DCI format N0, DCI format N1, and DCI format N2.

Now, uplink (UL) of the NB-IoT system will be described. SC-FDMA may be applied to the NB-IoT UL based on an SCS of 15 kHz or 3.75 kHz. The NB-IoT UL may support multi-tone transmission and single-tone transmission. For example, multi-tone transmission is supported only for the SCS of 15 kHz, whereas single-tone transmission may be supported for both of the SCSs of 15 kHz and 3.75 kHz.

As described in relation to the NB-IoT DL physical channels and physical signals, the physical channels of the NB-IoT system are named by adding "N (Narrowband)" to the names of their counterparts in the legacy system, so that the NB-IoT physical channels may be distinguished from those of the legacy system. For example, the NB-IoT UL physical channels may include narrowband physical random access channel (MPRACH) and narrowband physical uplink shared channel (NPUSCH), and NB-IoT UL physical signals may include narrowband demodulation reference signal (NDMRS).

The NPUSCH may be configured in NPUSCH format 1 or NPUSCH format 2. For example, NPUSCH format 1 may be used to transmit (or convey) a UL-SCH, and NPUSCH format 2 may be used to transmit uplink control information (UCI) such as hybrid automatic repeat request acknowledgment (HARQ ACK) signaling.

Characteristically, the NB-IoT DL channel, NPRACH may be repeatedly transmitted for coverage enhancement. Frequency hopping may be applied to the repeated transmissions.

NB-IoT operation modes will be described. The NB-IoT system may support three operation modes. FIG. 5 illustrates an example of operation modes supported in the NB-IoT system. While the NB-IoT operation modes are described in the context of an LTE band in the present disclosure, for convenience of description, they may also be extended to bands of other systems (e.g., the NR system).

Specifically, FIG. 5(a) illustrates an exemplary in-band system, FIG. 5(b) illustrates an exemplary guard-band system, and FIG. 5(c) illustrates an exemplary stand-alone system. The terms in-band system, guard-band system, and stand-alone system may be interchangeably used with in-band mode, guard-band mode, and stand-alone mode, respectively.

The in-band system may refer to a system or mode in which a specific one RB (i.e., PRB) in the (legacy) LTE band is used for NB-IoT. The in-band system may be operated by allocating an RB of an LTE system carrier.

The guard-band system may refer to a system or mode in which a space reserved for the guard band of the (legacy) LTE band is used for NB-IoT. The guard-band system may be operated by allocating a guard band unused as an RB in an LTE carrier of the LTE system. For example, each (legacy) LTE band may be configured to have a guard band of at least 100 kHz at the end of the LTE band. To use 200 kHz, two non-contiguous guard bands may be used.

As described above, the in-band system and the guard-band system may be operated with NB-IoT co-existence in the (legacy) LTE band.

Compared to the in-band system and the guard-band system, the stand-alone system may refer to a system or mode configured independently of the (legacy) LTE band. The stand-alone system may be operated by separately allocating a frequency band used in a GSM EDGE radio access network (GERAN) (e.g., a reallocated GSM carrier afterwards).

The above three operation modes may be used independently or in a combination of at least two thereof.

During a general NB-IoT signal transmission and reception procedure, an NB-IoT UE may transition to an idle state (e.g., RRC_IDLE state) and/or an inactive state (e.g., RRC_INACTIVE state) to reduce power consumption. The NB-IoT UE may be configured with DRX in the idle state and/or the inactive state. For example, the idle-state and/or inactive-state NB-IoT UE may be configured to monitor an MPDCCH related to paging only in a specific subframe (frame or slot) according to a DRX cycle set by the BS or the like. The NPDCCH related to paging may be an NPDCCH scrambled with a P-RNTI.

Random Access (RA) Procedure

Now, a random access procedure will be described. The random access procedure is also referred to as a random access channel (RACH) procedure. The random access procedure is used for various purposes including initial access, UL synchronization adjustment, resource allocation, handover, radio link re-establishment after radio link failure, and position measurement. Random access procedures are classified into a contention-based procedure and a dedicated (i.e., non-contention-based) procedure. The contention-based random access procedure generally involves initial access, whereas the dedicated random access procedure is used restrictively in the event of handover, DL data arrival, position measurement, and UL synchronization reconfiguration. In the contention-based random access procedure, the UE randomly selects an RACH preamble sequence. Accordingly, it is possible for a plurality of UEs to simultaneously transmit the same RACH preamble sequence, and thus a subsequent contention resolution process is required. In the dedicated random access procedure, the UE uses an RACH preamble sequence uniquely allocated to the UE by the BS. Therefore, the UE may perform the random access procedure without collision with other UEs.

FIG. 14 illustrates random access procedures. FIG. 14(a) illustrates the contention-based random access procedure, and FIG. 14(b) illustrates the dedicated random access procedure.

Referring to FIG. 14(a), the contention-based random access procedure includes the following four steps. The messages transmitted in steps 1 to 4 may be referred to as message 1 (Msg1) to message 4 (Msg4), respectively.

Step 1: The UE transmits an RACH preamble on a PRACH.

Step 2: The UE receives a random access response (RAR) on a DL-SCH from the BS.

Step 3: The UE transmits a Layer 2 (L2)/Layer 3 (L3) message on a UL-SCH to the BS.

Step 4: The UE receives a contention resolution message on the DL-SCH from the BS.

The UE may receive random access information in system information from the BS.

When the UE needs random access, the UE transmits an RACH preamble to the BS as in step 1. The BS may identify each RACH preamble by a time/frequency resource (RACH occasion (RO)) in which the RACH preamble is transmitted, and a preamble index (PI).

Upon receipt of the RACH preamble from the UE, the BS transmits an RAR message to the UE as in step 2. To receive the RAR message, the UE monitors an L1/L2 PDCCH with a cyclic redundancy check (CRC) masked with a random access-RNTI (RA-RNTI), including scheduling information for the RAR message, within a preconfigured time window (e.g., ra-ResponseWindow). The PDCCH masked with the RA-RNTI may be transmitted only in a common search space. When receiving a scheduling signal masked with the RA-RNTI, the UE may receive an RAR message on a PDSCH indicated by the scheduling information. The UE then checks whether there is RAR information directed to the UE in the RAR message. The presence or absence of the RAR information directed to the UE may be determined by checking whether there is a random access preamble ID (RAPID) for the preamble transmitted by the UE. The index of the preamble transmitted by the UE may be identical to the RAPID. The RAR information includes the index of the corresponding RACH preamble, timing offset information (e.g., timing advance command (TAC)) for UL synchronization, UL scheduling information (e.g., UL grant) for Msg3 transmission, and UE temporary identification information (e.g., temporary-C-RNTI (TC-RNTI)).

Upon receipt of the RAR information, the UE transmits UL-SCH data (Msg3) on a PUSCH according to the UL scheduling information and the timing offset value, as in step 3. Msg3 may include the ID (or global ID) of the UE. Alternatively, Msg3 may include RRC connection request-related information (e.g., RRCSetupRequest message) for initial access. In addition, Msg3 may include a buffer status report (BSR) on the amount of data available for transmission at the UE.

After receiving the UL-SCH data, the BS transmits a contention resolution message (Msg4) to the UE as in step 4. When the UE receives the contention resolution message and succeeds in contention resolution, the TC-RNTI is changed to a C-RNTI. Msg4 may include the ID of the UE and/or RRC connection-related information (e.g., an RRC-Setup message). When information transmitted in Msg3 does not match information received in Msg4, or when the UE has not received Msg4 for a predetermined time, the UE may retransmit Msg3, determining that the contention resolution has failed.

Referring to FIG. 14(b), the dedicated random access procedure includes the following three steps. Messages transmitted in steps 0 to 2 may be referred to as Msg0 to Msg2, respectively. The BS may trigger the dedicated random access procedure by a PDCCH serving the purpose of commanding RACH preamble transmission (hereinafter, referred to as a PDCCH order).

Step 0: The BS allocates an RACH preamble to the UE by dedicated signaling.

Step 1: The UE transmits the RACH preamble on a PRACH.

Step 2: The UE receives an RAR on a DL-SCH from the BS.

Steps 1 and 2 of the dedicated random access procedure may be the same as steps 1 and 2 of the contention-based random access procedure.

In NR, DCI format 1_0 is used to initiate a non-contention-based random access procedure by a PDCCH order. DCI format 1_0 is used to schedule a PDSCH in one DL cell. When the CRC of DCI format 1_0 is scrambled with a C-RNTI, and all bits of a "Frequency domain resource assignment" field are 1s, DCI format 1_0 is used as a PDCCH order indicating a random access procedure. In this case, the fields of DCI format 1_0 are configured as follows.

RA preamble index: 6 bits

UL/supplementary UL (SUL) indicator: 1 bit. When the bits of the RA preamble index are all non-zeroes and SUL is configured for the UE in the cell, the UL/SUL indicator indicates a UL carrier in which a PRACH is transmitted in the cell. Otherwise, it is reserved.

SSB (Synchronization Signal/Physical Broadcast Channel) index: 6 bits. When the bits of the RA preamble index are all non-zeroes, the SSB indicator indicates an SSB used to determine an RACH occasion for PRACH transmission. Otherwise, it is reserved.

PRACH mask index: 4 bits. When the bits of the RA preamble index are all non-zeroes, the PRACH mask index indicates an RACH occasion associated with the SSB indicated by the SSB index. Otherwise, it is reserved.

Reserved: 10 bits

When DCI format 1_0 does not correspond to a PDCCH order, DCI format 1_0 includes fields used to schedule a PDSCH (e.g., a time domain resource assignment, a modulation and coding scheme (MCS), an HARQ process number, a PDSCH-to-HARQ_feedback timing indicator, and so on).

An MTC UE may perform a random access (or RACH) procedure. A basic configuration related to the RACH procedure is transmitted in SIB2. SIB2 further includes parameters related to paging. A paging occasion (PO) is a subframe available for P-RNTI transmission on an MPDCCH. When the P-RNTI PDCCH is repeatedly transmitted, the PO refers to the starting subframe of the MPDCCH repetitions. A paging frame (PF) is one radio frame including one or more POs. When DRX is used, the MTC UE monitors only one PO per DRX cycle. A paging narrowband (PNB) is one narrowband in which the MTC UE performs paging message reception.

For this purpose, the MTC UE may transmit a preamble on a PRACH and receive an MPDCCH and a preamble response message (RAR) for the preamble on a PDSCH corresponding to the MPDCCH. In contention-based random access, the MTC UE may perform a contention resolution procedure involving transmission of an additional PRACH signal and reception of an MPDCCH signal and a PDSCH signal corresponding to the MPDCCH signal. Signals and/or messages Msg 1, Msg 2, Msg 3, and Msg 4 transmitted in the RACH procedure may be repeatedly transmitted in MTC, and a different repetition pattern is configured according to a CE level. Msg 1 may be a PRACH preamble, Msg 2 may be an RAR, Msg 3 may be a UL transmission of the MTC UE in response to the RAR, and Msg 4 may be a DL transmission of the BS in response to Msg 3.

For random access, signaling of different PRACH resources and different CE levels is supported. This provides the same control of the near-far effect for the PRACH by grouping UEs experiencing similar pathloss into the same group. Up to four different PRACH resources may be signaled to the MTC UE.

An NB-IoT may perform a random access procedure to complete a connection to a BS.

Specifically, the NB-IoT UE may transmit a preamble to the BS on an NPRACH. As described before, the NPRACH may be configured to be repeatedly transmitted based on frequency hopping, for coverage enhancement. In other words, the BS may (repeatedly) receive the preamble from the NB-IoT UE on the NPRACH.

The NB-IoT UE may then receive an NPDCCH and an RAR for the preamble on an NPDSCH corresponding to the NPDCCH from the BS. In other words, the BS may transmit the NPDCCH and the RAR for the preamble on the NPDSCH corresponding to the NPDCCH to the NB-IoT UE.

Subsequently, the NB-IoT UE may transmit an NPUSCH to the BS based on scheduling information included in the RAR, and may perform a contention resolution procedure involving reception of an NPDCCH and an NPDSCH corresponding to the NPDCCH. In other words, the BS may receive the NPUSCH from the UE based on the scheduling information included in the NB-IoT RAR and perform the collision resolution procedure.

Early Data Transmission (EDT)

In MTC and NB-IoT, a UE in the RRC_IDLE state may transmit and receive data to and from a camped-on BS, while maintaining the idle state without an RRC connection established with the BS. This scheme is called early data transmission (EDT). In the EDT procedure, the UE transmits a random access preamble in a random access preamble resource separately allocated for EDT in order to transmit data to the camped-on BS. Upon receipt of the random access preamble for EDT, the BS indicates to the UE whether an EDT data transmission procedure is allowed by transmitting Msg2. When the BS allows EDT data transmission, the UE transmits user data or information about a buffer state along with its global ID in Msg3. The BS may then transmit information indicating whether the data has been received successfully and user data in Msg4 to the UE. Data transmission and reception between the BS and the UE may continue even after Msg4 according to BS control. When the data transmission and reception is completed, the UE ends the EDT procedure without establishing an RRC connection with the BS.

1. IoT Modes

IoT modes used in the present disclosure will be described below.

IoT mode: refers to a communication method or communication operation mode that supports a specific combination of wireless environments/features and/or UE features. For example, the IoT mode may be a communication method or communication operation mode that supports a combination of different levels, such as coupling loss compensation levels, UE complexities (such as the operation bandwidths of UEs), battery consumption levels, and so on. In a specific example, a general non-BL operation, a non-BL CE mode operation (CEmodeA/B), an eMTC operation, and an NB-IoT operation in the 3GPP LTE and/or NR system may be defined as different IoT modes. When it is said that a UE operates in a specific IoT mode, this implies that the UE i) uses a bandwidth supported by the IoT mode, ii) uses an (N/M)PDCCH/PDSCH/PUSCH/PUCCH/PRACH structure specific to the IoT mode, and/or iii) transmits and receives physical channels corresponding to a channel repetition number (CE level) specific to the IoT mode, during communication (e.g., paging, RACH, data transmission/reception, and so on) with the BS. While a communication method or communication operation mode that supports a specific combination of wireless environments/features and/or UE features is referred to as an IoT mode for convenience and ease of description, the IoT mode may cover a communication scheme performed in a non-IoT manner (not with low power and low complexity) in its broad sense, that is, a communication method or communication operation mode in which a UE of a general UE Category (Cat) operates. For example, the IoT mode used in a broad sense in the present disclosure may be interpreted as a non-IoT mode in the 3GPP communication system and a plurality of modes included in the IoT mode depending on communication systems. The IoT mode in the 3GPP communication system may be referred to as an IoT mode in a narrow sense. To this effect, the IoT mode may be understood as a set of a UE category and an IoT mode in a narrow sense (or the plurality of modes included in the IoT mode) in the present disclosure. Further, an IoT mode may be interchangeably used with a UE category, an IoT mode in a broad sense, and an IoT mode in a narrow sense (or a plurality of modes in an IoT mode) in the present disclosure.

Non-BL mode: a mode in which a UE of a general UE category (e.g., Category 0, Category 1, or higher categories, and supporting a bandwidth of 20 MHz) operates.

Non-BL CE mode: a mode in which a UE without any bandwidth limitation (e.g., supporting a bandwidth of 20 MHz) in the LTE system operates to receive an MPDCCH and support a large number of repetitions and/or a high CE level as in CE Mode A/B of eMTC, for compensating for larger coupling loss.

eMTC mode: a mode conforming to the eMTC standard of the LTE system.

NB-IoT mode: a mode conforming to the NB-IoT standard of the LTE system.

Besides the IoT modes explicitly defined above, an IoT mode using a specific bandwidth, a specific channel, and/or a specific number of channel repetitions (CE level) may be defined. The explicitly defined IoT modes and other IoT modes may be numbered as a first mode, a second mode, and so on. Alternatively, the explicitly defined IoT modes and other IoT modes may be numbered as a first IoT mode, a second IoT mode, and so on.

Further, a mode described as conforming to a relevant standard of the LTE system among the modes defined in the present disclosure may be replaced with a mode in which the same bandwidth, channels, and/or number of repetitions (CE level) is supported in the NR system. For example, the mode described as conforming to the relevant standard of the LTE system may be understood as a mode conforming to a different NR UE capability-related standard or NR-light standard in the NR system.

2. Switching Between IoT Modes

Along with the recent increasing demands for various wireless communication services compared to the existing person-to-person communication, various wireless communication schemes have been developed to efficiently support communication such as machine-to-person and machine-to-machine communication, which are collectively referred to as IoT. A typical example of a cellular wireless communication scheme is the 3GPP LTE system. The LTE system supports eMTC for low complexity, low power, and compensation for large coupling loss, NB-IoT for lower complexity, lower power, and compensation for larger coupling loss, and modes in which UEs of legacy categories operate in CEmodeA/B of eMTC to compensate for large coupling loss, as well as a basic communication scheme (a scheme supporting communication in a maximum bandwidth of 20 MHz through the existing Cat0 or Cat1 or higher UE categories). Based on the description of 1. IoT modes, the non-BL mode, eMTC mode, NB-IoT mode, and non-BL CE mode are defined in the present disclosure. While the IoT modes are described in the context of the LTE system for convenience in the present disclosure, when one UE supports operation methods supporting different levels of power consumption (e.g., wake-up/sleeping cycle), different levels of UE complexity (e.g., supported bandwidths), and different levels of coupling loss compensation (e.g., transmission repetition numbers) in a system other than 3GPP NR or 3GPP, the operation methods may be regarded as IoT modes.

Even for one device, different data transmission rates, coupling loss, and power consumption may be suitable in different situations or services. Therefore, it may be efficient for one device to switch to another IoT mode and operate in the switched IoT mode, while supporting a plurality of IoT modes. For example, in a waiting state for parking in an underground parking lot, the UE may perform minimal communication with the BS in the NB-IoT mode that enables low power and large coupling loss compensation. When a driver is in a vehicle, it may be efficient for a UE to perform large-capacity data communication for a smooth user data service in the non-BL mode. The UE may be located in the vehicle or may be the vehicle itself. In the present disclosure, for example, a scenario in which a UE supports both of the NB-IoT mode and the non-BL mode and switches between the two modes may be implemented. Hardware supporting the two modes may be implemented on one integrated chip or on two chips mounted in one device. Further, the hardware supporting the two modes may include physically separated devices, and with the devices mounted at different locations in the vehicle, a communication line may be connected between the devices, for IoT mode switching between the devices.

In the current LTE system, when a UE supporting a plurality of different IoT modes intends to change its operation from one IoT mode to another IoT mode, the UE disconnects from a cell and reconnects to the cell, or performs a procedure corresponding to handover between cells, suffering from significant delay and data loss. For seamless user communication, the delay and data loss need to be minimized. Particularly, considering that the UE may experience a delay of hundreds of milliseconds to tens of seconds for initial access to the BS in an IoT-mode or eMTC-mode operation for compensating for large coupling loss, it may be very significant to reduce delay involved in IoT mode switching of the UE supporting a plurality of IoT modes to handle various service changes.

In IoT mode switching methods proposed in the present disclosure, it may be assumed that the BS has knowledge of a single ID for one UE supporting a plurality of IoT modes. Alternatively, it may be assumed that the BS is aware that even though different IDs are registered for a plurality of IoT modes supported by one UE, the IDs belong to the same UE. Alternatively, the UE may switch between a plurality of IoT modes using only one ID. The ID may be the global ID of the UE, such as a temporary mobile subscriber identity/international mobile subscriber identity (TMSI/IMSI). Further, the ID may be an ID uniquely assigned to a device (UE) supporting a plurality of IoT modes in a specific network. Without knowledge of a specific UE using a plurality of global IDs, the BS may have to transmit as many paging messages as IoT modes. When the BS is aware that one UE uses a plurality of IDs and/or when the UE uses one global ID, the BS may transmit only one paging message to the UE, thereby reducing signaling overhead.

While the description of the present disclosure focuses on switching between predefined modes in the 3GPP standards for convenience, the description is equally applied to switching between the explicitly defined IoT modes and/or other IoT modes. For example, a specific first IoT mode may be switched to a second IoT mode different from the first IoT mode by an operation described herein.

(1) IoT Mode Switching Related to Transition from RRC_CONNECTED State to RRC_IDLE State In the present disclosure, a UE may be a terminal mounted in a vehicle. Further, the UE may be an autonomous driving vehicle as described later with reference to FIG. 15.

For example, when a vehicle (or an autonomous vehicle) equipped with a UE is placed in a state that does not require large-capacity communication with a BS, such as a parking state, it may be favorable for a UE operation to minimize the power consumption of the UE. Alternatively, in case the ambient environment of the UE in the waiting mode changes to an environment with large coupling loss, such as an underground parking lot, it may be favorable for a UE operation to switch the IoT mode of the UE to an IoT mode enabling compensation of larger coupling loss. In a specific example, a movable UE such as a vehicle-related UE may move to a place requiring wide coverage support such as an underground parking lot after an RRC connection is released. The RRC-disconnected UE may need to re-track the coverage, and the re-tracking process for coverage switching includes additional data transmission/reception, processes of the UE and the network (e.g. re-performing the random access procedure and/or switching the global ID of the UE). Therefore, to prevent the resulting resource consumption and delay, IoT mode switching in relation to transition to the RRC_IDLE state may be favorable for the operations of the UE and the network. For example, the UE may switch its IoT mode to the non-BL CE mode, the eMTC mode, or the NB-IoT mode, simultaneously when the UE which is communicating in the non-BL mode with an established RRC connection transitions to the RRC_IDLE state or within a predetermined time from a time when the UE receives an RRC connection release message indicating transition to the RRC_IDLE state. In another example, the UE may switch its IoT mode to the NB-IoT mode, simultaneously when the UE which is communicating in the eMTC mode with an established RRC connection transitions to the RRC_IDLE state or within a predetermined time from a time when the UE receives an RRC connection release message indicating transition to the RRC_IDLE state. In the present disclosure, when the UE switches from one IoT mode to another IoT mode, the former IoT mode may be referred to as a source IoT mode, and the latter IoT mode may be referred to a target IoT mode. Method (1-1) and/or Method (1-2) may be given as specific examples in which the UE switches from one IoT mode to another IoT mode in relation to transition from the RRC_CONNECTED state to the RRC_IDLE state.

Method (1-1) A BS indicates IoT mode switching along with an indication of RRC connection release to an RRC_CONNECTED UE.

FIG. 7(a) illustrates operations of a UE and a BS when the BS indicates an IoT mode together with RRC connection release to the UE in the RRC_CONNECTED state, and FIG. 7(b) illustrates the operation of the UE when the BS indicates an IoT mode together with RRC connection release to the UE in the RRC_CONNECTED state.

When the BS transmits an RRC connection release message to the UE, the BS may transmit, to the UE, an indication of switching to an IoT mode in which the UE monitors paging in the RRC_IDLE state along with the RRC connection release message. The indication of switching to the IoT mode for paging monitoring may include an indication of a target IoT mode. For example, the non-BL CE mode, the eMTC mode, or the NB-IoT mode may be indicated as the target IoT mode to the UE in the non-BL mode as a source IoT mode.

For example, the network may determine the UE's switching to the idle mode to be efficient based on information such as the buffer state, service state, and/or location information of the UE. The network which has made the determination may indicate to the BS to switch the UE to the RRC_IDLE state. Accordingly, the BS may indicate RRC connection release to the UE.

To allow the UE to receive paging in the target IoT mode, the BS may indicate parameters required for the UE to operate in the target IoT mode to the UE, such as a repetition number and/or CE level to be applied to (N/M)PDCCH/PDSCH reception. The parameters required for the operation in the target IoT mode may be preconfigured for the UE by an RRC configuration message before the RRC connection release message is transmitted. The parameters required for the operation in the target IoT mode may be configured for the UE by the RRC connection release message. The BS may indicate which one of one or more parameter sets preconfigured for the UE by an RRC configuration message will be applied to the UE by the RRC connection release message to configure the UE with the parameters required for the operation in the target IoT mode.

After switching from the source IoT mode to the target IoT mode along with transitioning from the RRC_CONNECTED state to the RRC_IDLE state, the UE may monitor paging based on the parameters configured by the indication of the BS. The paging monitoring operation includes monitoring whether there is any P-RNTI PDCCH transmission in a PO. Upon detection of the P-RNTI PDCCH, the UE may receive a PDSCH indicated by the P-RNTI PDCCH. The PDSCH includes the global ID of the UE and information directed to the UE. (Repeated) transmission/reception of the P-RNTI PDCCH/PDSCH may be performed based on the target IoT mode.

The UE, which has received information related to the target IoT mode, may start to operate in the target IoT mode even before the source IoT-mode operation configured for the UE is completely released. The UE may operate in the target IoT mode before the current configured source IoT mode is released, in order to test and/or verify whether the UE is actually capable of operating in the indicated target IoT mode. For example, whether expected requirements (e.g., coverage, power saving, and so on) are satisfied during operations of the BS and the UE in the target IoT mode may be tested and/or verified.

When the BS and/or the UE determines that an expected benefit is not sufficiently achieved or a problem occurs in the target IoT mode during the testing and/or verification process, the UE may be configured to receive a new IoT mode configuration from the BS or to stay in the source IoT mode. For example, in the case where the target IoT mode includes a CE Mode A configuration, when the BS fails to receive a feedback such as a PUCCH/PUSCH from the UE or feedback reception performance does not satisfy a specific SINR value, the BS may reconfigure the target IoT mode to include a CE Mode B configuration supporting wider coverage.

Method (1-2) A UE in the RRC_CONNECTED state requests IoT mode switching along with a request for RRC connection release to the BS.

FIG. 8(a) illustrates operations of a UE and a BS, when the UE in the RRC_CONNECTED state requests IoT mode switching along with a request for RRC connection release to the BS, and FIG. 8(b) illustrates the operation of the UE when the UE in the RRC_CONNECTED state requests IoT mode switching along with a request for RRC connection release to the BS.

The UE in the RRC_CONNECTED state may request switching to an IoT mode for paging monitoring in the RRC_IDLE state, along with transmission of an RRC connection release request message to the BS. The UE may also request a preferred IoT mode together with IoT mode switching. For example, the UE in the non-BL mode as a source IoT mode may request the non-BL CE mode, the eMTC mode, or the NB-IoT mode as a target IoT mode. Alternatively, the UE in the eMTC mode as the source IoT mode may request the NB-IoT mode as the target IoT mode. The preferred target IoT mode may be determined in consideration of the state of the UE before transitioning to the RRC_IDLE state. The state of the UE may be determined, for example, in consideration of RSRP, RSRQ, and/or reception pathloss. Alternatively, the preferred target IoT mode may be determined based on the worst predictable communication environment. The worst predictable communication environment may be determined, for example, using statistically lowest RSRP, statistically lowest RSRQ, and/or statistically largest reception pathloss as a criterion. When the BS indicates RRC connection release in response to the request of the UE, the UE may transition to the RRC_IDLE state and monitor paging based on its requested preferred target IoT mode. When the BS rejects the request for switching to the preferred target IoT mode from the UE or indicates to the UE to switch to another target IoT mode, the UE may perform paging monitoring and other necessary operations (e.g., DL measurement, cell selection/reselection, random access, and so on) in the RRC_IDLE state, while staying in the source IoT mode or in the target IoT mode indicated by the BS. For example, the type and signal bandwidth of a DL RS to be used for a DL measurement, the periodicity of DL measurement and reporting, a radio link failure condition, a condition for a cell available for access (e.g., whether eMTC or NB-IoT is supported), a resource to be used for transmission of a random access preamble, and/or a random access preamble structure may vary according to IoT modes. Further, the UE may request a second target IoT mode that may be used when a problem occurs in the operation in the target IoT mode. The second target IoT mode may be configured for a fallback operation in case the corresponding target IoT mode may not be used. For example, when the detected value of a received DL signal is lower than a specific value, data to be transmitted by the UE is not so suitable as to be supported in the target IoT mode, and/or the target IoT mode does not support a data rate required for data transmission of the UE, a problem may occur to the operation in the target IoT mode. The second target IoT mode may be set by an indication of the BS in response to the request of the UE. Alternatively, the BS may set the second target IoT mode without a request from the UE.

Considering that the legacy communication system does not support a procedure of requesting RRC connection release to a BS by a UE, the UE in the RRC_CONNECTED state may pre-negotiate a preferred IoT mode with the BS by an RRC message, for use in the RRC_IDLE state. For example, the UE may transmit information about the preferred target IoT mode to the BS in the RRC_CONNECTED state. The BS may approve or reject switching to the preferred target IoT mode requested by the UE, or indicate to the UE to switch to another target IoT mode. The UE may transmit, to the BS, information about a second preferred target IoT mode to be used when a problem occurs to an operation in the preferred target IoT mode. The BS may approve switching to one of a plurality of preferred target IoT modes requested by the UE or may indicate to the UE to switch to another target IoT mode. After the target IoT mode for the RRC_IDLE state is negotiated between the BS and the UE, when the BS indicates to the UE to release the RRC connection or when the UE transitions to the RRC_IDLE state for some other reason, the UE may monitor paging based on the negotiated target IoT mode.

The BS may indicate parameters required for an operation in the target mode to the UE, such as a repetition number and/or CE level to be applied to (N/M)PDCCH/PDSCH reception, for paging reception in the target IoT mode. The parameters required for the operation in the target IoT mode may be preconfigured for the UE by an RRC configuration message before the RRC connection release process. The parameters required for the operation in the target IoT mode may be configured for the UE by a response message that the BS transmits in response to the RRC connection release request from the UE. The BS may indicate which one of one or more parameter sets preconfigured for the UE by the RRC configuration message to the UE by the response message for the RRC connection release request, so that the parameters required for the operation in the target IoT mode may be configured for the UE.

The UE may switch from the source IoT mode to the target IoT mode while transitioning from the RRC_CONNECTED state to the RRC_IDLE state according to its request and/or the indication of the BS, and then monitor paging based on parameters configured by the indication from the BS. The operation of monitoring paging includes an operation of monitoring whether there is any P-RNTI PDCCH transmission in a PO. Upon detection of the P-RNTI PDCCH, the UE may receive a PDSCH indicated by the P-RNTI PDCCH. The PDSCH includes the global ID of the UE and information directed to the UE. (Repeated) transmission/reception of the P-RNTI PDCCH/PDSCH may be performed based on the target IoT mode.

After switching from the source IoT mode to the target IoT mode while transitioning from the RRC_CONNECTED state to the RRC_IDLE state according to its request and/or the indication of the BS, the UE may perform operations (e.g., DL measurement, cell selection/reselection, random access, and so on) required in the RRC_IDLE state in addition to the paging monitoring based on the parameters configured by the indication from the BS.

When supported details according to the IoT modes are standardized, it may be advantageous in terms of a UE operation for the UE to change an IoT mode by an RRC connection release request in consideration of its application.

(2) IoT Mode Switching in Relation to Transitioning from RRC_IDLE State to RRC_CONNECTED State As described before, the UE according to the present disclosure may be a UE mounted in a vehicle. Further, the UE according to the present disclosure may be an autonomous driving vehicle as described with reference to FIG. 15.

When a UE is to establish an RRC connection to minimize power consumption in a waiting state such as a parking state or when a UE needs large-capacity communication for such a reason as firmware update and thus is to establish an RRC connection in an IoT mode suitable for low power/CE in the RRC_IDLE state in an environment with large coupling loss such as an underground parking lot, the UE may need to switch to an IoT mode supporting a larger data capacity. In a specific example, when the UE that has stayed in the IoT mode suitable for low power/CE in the RRC_IDLE state in an underground parking lot or the like leaves the underground parking lot, the UE may transition to the RRC_CONNECTED state. A UE moving on the ground may preferably operate in an IoT mode supporting a high data rate despite support of smaller coverage. When a UE that has already entered the RRC_CONNECTED state is to switch to the IoT mode with a high data rate, additional data transmission/reception and processes of the UE and network (e.g., re-performing the random access procedure and/or switching a UE global ID) are required. Therefore, it may be advantageous for operations of the UE and the network to switch the IoT mode in relation to transition to the RRC_CONNECTED state to prevent resource consumption and delay. For example, a UE that has stayed in the RRC_IDLE state in the non-BL CE mode, the eMTC mode, or the NB-IoT mode may switch the IoT mode to the non-BL mode simultaneously with RRC connection establishment or within a predetermined time from the starting time of an RRC connection process. In another example, a UE that has stayed in the RRC_IDLE state in the NB-IoT mode may switch the IoT mode to the eMTC mode simultaneously with RRC connection establishment or within a predetermined time from the starting time of an RRC connection process. Method (2-1) and/or Method (2-2) may be given as a specific example in which a UE switches its IoT mode along with transitioning from the RRC_IDLE state to the RRC_CONNECTED state.

Method (2-1) A BS indicates IoT mode switching to a UE in RRC_IDLE state, while transmitting a paging message to the UE.

FIG. 9(a) illustrates operations of a UE and a BS, when the BS indicates IoT mode switching to a UE in the RRC_IDLE state, while transmitting a paging message to the UE, and FIG. 9(b) illustrates the operation of the UE when the BS indicates IoT mode switching to the UE in the RRC_IDLE state, while transmitting a paging message to the UE.

When transmitting a paging message to a UE in the RRC_IDLE state, the network (e.g., eNB or gNB) may also indicate IoT mode switching to the UE by a paging message. Because the paging message includes the global ID of the specific UE, the network may indicate to the UE corresponding to the global ID to switch its IoT mode. The global ID may be, for example, a TMSI and/or an IMSI.

The BS may indicate a target IoT mode by the paging message. Upon receipt of the paging message, the UE attempts random access to establish an RRC connection with the BS. For random access, the UE may operate according to the following options.

Option 1) A UE performs random access based on a source IoT mode.

Upon receipt of a paging message directed to the UE, the UE may establish an RRC connection with the BS in a procedure of transmitting a random access preamble, receiving Msg2, transmitting Msg3, and receiving Msg4 in a method based on the source IoT mode. After the RRC connection, the UE may switch to the target IoT mode and then perform data transmission and reception to and from the BS and an operation required for the RRC_CONNECTED state. For example, a random access preamble structure to be used, a resource for transmitting an access preamble, a repetition number for the access preamble, an (M/N)PDCCH/(N)PDSCH structure to be applied to Msg2/4 reception, an (M/N)PDCCH/(N)PDSCH repetition number to be applied to the Msg2/4 reception, an (N)PUSCH structure to be applied to Msg3 transmission, and/or an (N)PUSCH repetition number to be applied to the Msg3 transmission may vary according to IoT modes.

The BS may indicate parameters required for operation in the target IoT mode, such as repetition numbers and/or CE levels to be applied to (N/M) PDCCH/PDSCH reception and (N/M)PUCCH/PUSCH transmission. The parameters required for operation in the target IoT mode may be configured directly for the UE by a paging message, a message (e.g., Msg4) transmitted in the RRC connection process, and/or a message transmitted to the UE after the RRC connection process. The parameters required for operation in the target IoT mode may be preconfigured for the UE by an RRC configuration message during RRC connection establishment before the UE is placed in the RRC_IDLE state. The BS may indicate which one of parameter sets preconfigured for the UE based on the RRC configuration message during RRC connection establishment before the RRC_IDLE state is to be applied to the UE by the paging message, the message (e.g., Msg4) transmitted in the RRC connection process, and/or the message transmitted to the UE after the RRC connection process, so that the parameters required for operation in the target IoT mode may be configured for the UE.

Alternatively, the BS may indicate a target IoT mode and/or related parameters by a message (e.g., Msg4 or an RRC connection setup message) that the BS transmits to the UE in the RRC connection process, instead of the paging message.

In the case where the source IoT mode may support wider coverage than the target IoT mode (e.g., while the UE is operating in an area with large pathloss such as an underground parking lot), when the UE receiving the paging message starts a random access procedure in the target IoT mode, the random access operation is performed within smaller coverage, and thus the UE may fail to access a cell. The operation of Option 1 may create the gain of avoiding the cell access failure of the UE. On the contrary, in the case where the source IoT mode supports smaller coverage than the target IoT mode, a problem may occur to paging signal reception in an area with large pathloss, such as an underground parking lot. Therefore, it may be advantageous in terms of a UE operation to allow the source IoT mode to support wider coverage than the target IoT mode and to perform a random access operation in the source IoT mode.

Option 2) A UE performs random access based on a target IoT mode.

Upon receipt of a paging message directed to the UE, the UE establishes an RRC connection with the BS by a procedure of transmitting a random access preamble, receiving Msg2, transmitting Msg3, and receiving Msg4 in a method based on the target IoT mode, and performs a necessary operation in the RRC_CONNECTED state based on the target IoT mode. For example, a random access preamble structure to be used, a resource for transmitting an access preamble, a repetition number for transmitting the access preamble, an (M/N)PDCCH/(N)PDSCH structure to be applied to Msg2/4 reception, an (M/N)PDCCH/(N)PDSCH repetition number to be applied to the Msg2/4 reception, an (N)PUSCH structure to be applied to Msg3 transmission, and/or an (N)PUSCH repetition number to be applied to the Msg3 transmission may vary according to IoT modes.

The BS may indicate parameters required for operation in the target IoT mode, such as repetition numbers and/or CE levels to be applied to (N/M) PDCCH/PDSCH reception and (N/M)PUCCH/PUSCH transmission, so that the UE may operate in the target IoT mode. The parameters required for operation in the target IoT mode may be configured directly for the UE by a paging message, a message (e.g., Msg4) transmitted in the RRC connection process, and/or a message transmitted to the UE after the RRC connection process. The parameters required for operation in the target IoT mode may be preconfigured for the UE by an RRC configuration message during RRC connection establishment before the UE is placed in the RRC_IDLE state. The BS may indicate which one of parameter sets preconfigured for the UE based on the RRC configuration message during RRC connection establishment before the RRC_IDLE state is to be applied to the UE by the paging message, the message (e.g., Msg4) transmitted in the RRC connection process, and/or the message transmitted to the UE after the RRC connection process, so that the parameters required for operation in the target IoT mode may be configured for the UE. Even for the same IoT mode, different parameter sets may be prepared for a maximum repetition number applied to the (N)PRACH, the (M/N)PDCCH, the (N)PDSCH, and the (N)PUSCH and/or (N) PRACH resources according to a repletion number. For example, when different parameter sets are configured for UEs in the same IoT mode, maximum repetition numbers for a channel and/or channel transmission resources may be different for the UEs.

Option 3) A UE follows one of Option 1) and Option 2) according to a condition autonomously determined by the UE.

Upon receipt of a paging message directed to the UE, the UE may select Option 1) or Option 2) based on a specific condition such as the strength (e.g., RSRP) of a signal received from the BS and perform random access in the selected option. For example, when an RSRP measurement from the BS is equal to or less than a predetermined value, the UE may operate in Option 1) and otherwise, the UE may operate in Option 2.

(3) IoT Mode Switching in RRC_IDLE State

As described before, the UE according to the present disclosure may be a UE mounted in a vehicle. Further, the UE according to the present disclosure may be an autonomous driving vehicle as described with reference to FIG. 15.

For example, the environment of a UE that is monitoring paging in a specific IoT mode in the RRC_IDLE state may be changed to an environment with large coupling loss, such as an underground parking lot. To receive paging in a manner that compensates for large coupling loss, the UE needs to switch to an IoT mode suitable for coverage enhancement, while maintaining the RRC_IDLE state. For example, a UE that has stayed in the RRC_IDLE state in the non-BL mode may switch the IoT mode to the non-BL CE mode, the eMTC mode, or the NB-IoT mode, while maintaining the RRC_IDLE state. In another example, a UE that has stayed in the RRC_IDLE state in the eMTC mode may switch the IoT mode to the NB-IoT mode, while maintaining the RRC_IDLE state. On the contrary, when the vehicle leaves the underground parking lot, the UE may switch the IoT mode to an IoT mode that does not need to compensate for large coupling loss, for more efficient paging reception. For example, a UE that has stayed in the RRC_IDLE state in the non-BL CE mode, the eMTC mode, or the NB-IoT mode may switch the IoT mode to the non-BL mode, while maintaining the RRC_IDLE state. In another example, a UE that has stayed in the RRC_IDLE state in the NB-IoT mode may switch the IoT mode to the eMTC mode, while maintaining the RRC_IDLE state. Method (3-1) may be given as a specific example in which the UE switches its IoT mode in the RRC_IDLE state.

Method (3-1) A UE in the RRC_IDLE state requests IoT mode switching through a random access procedure.

FIG. 10 illustrates a UE operation, when a BS indicates IoT mode switching to a UE in the RRC_IDLE state, while transmitting a paging message to the UE.

The UE in the RRC_IDLE state may indicate to the BS that the UE will operate in a target IoT mode different from a source IoT mode in the RRC_IDLE state or request the BS to allow the UE to operate in the target IoT mode. The request may be included in Msg3 that the UE transmits after transmitting a random access preamble and receiving Msg2 from the BS. Alternatively, the request may be included in an (EDT-based) message transmitted after the Msg3 transmission. The BS may accept or reject the request for operation in the target IoT-mode by transmitting a response message in response to the request message of the UE. Msg3 may include a CCCH SDU associated with a UE contention resolution ID (e.g., UE global ID) for contention resolution, and thus may deliver information about the UE that requests IoT mode switching to the BS by the CCCH SDU.

To enable the UE to receive paging in the target IoT mode, the BS may indicate parameters required for operation in the target IoT mode, such as a repetition number and/or CE level to be applied to (N/M)PDCCH/PDSCH reception. The parameters required for operation in the target IoT mode may be directly configured for the UE by a paging message, a message (e.g., Msg4) transmitted during an RRC connection process, and/or a message (e.g., EDT-based message) transmitted to the UE after the RRC connection process. The parameters required for operation in the target IoT mode may be preconfigured for the UE by an RRC configuration message during RRC connection establishment before the UE is placed in the RRC_IDLE state. The BS may indicate which one of one or more parameter sets preconfigured for the UE by the RRC configuration message during RRC connection establishment before the UE is placed in the RRC_IDLE state to the UE by the paging message, the message (e.g., Msg4) transmitted during the RRC connection process, and/or the message (e.g., EDT-based message) transmitted to the UE after the RRC connection process, so that the parameters required for the operation in the target IoT mode may be configured for the UE.

When the IoT mode is changed in the RRC_IDLE state, the UE does not need to perform a connection procedure with the BS by a random access procedure. Therefore, when the UE is in the NB-IoT, eMTC, or NR-lite state, the UE may perform the random access procedure based on an EDT operation defined in a relevant standard.

The UE may receive paging and/or perform a necessary operation in its requested target IoT mode in the RRC_IDLE state based on the response of the BS (when the BS accepts switching of the UE to the target IoT mode). Alternatively, the UE may receive paging and/or perform a necessary operation in the source IoT mode based on the response of the BS (when the BS rejects switching of the UE to the target IoT mode).

Implementation Example

One or more of the operations described above may be organically combined to implement embodiments.

One of the embodiments that may be implemented by a combination of the operations described above may be given as illustrated in FIG. 11.

Referring to FIG. 11, embodiments of the disclosure may be implemented by a communication device including a UE, which include receiving an RRC connection release message (S1101) and releasing an RRC connection based on the RRC connection release message (S1103).

The RRC connection release message may include information about a target IoT mode. Further, the communication device switches from a source IoT mode to the target IoT mode based on the information about the target IoT mode. A time of switching the IoT mode may be related to the RRC connection release operation. For example, the IoT mode may be switched simultaneously with the RRC connection release. However, the RRC connection release and the IoT mode switching are not necessarily simultaneous, and the IoT mode switching may be performed within a predetermined time after the UE receives the RRC connection release message.

The information about the target IoT mode may be transmitted in the RRC connection release message by the network. Further, the RRC connection release message may be transmitted in response to a RRC connection release request message from the communication device. The RRC connection release request message may include target IoT mode information about one or more target IoT modes preferred by the communication device. Further, the target IoT mode information may be predetermined based on a result of negotiation between the communication device and the network, before the communication device receives the RRC connection release message. The communication device may receive the predetermined target IoT mode information before receiving the RRC connection release message.

Information about one or more parameters for operation in the target IoT mode may be received in an RRC configuration message before the RRC connection release and/or in the RRC connection release message. The information about the one or more parameters may include information about one or more parameter sets.

The communication device may test whether the operation in the target IoT mode satisfies a specific condition, before the RRC connection release. When the test is satisfied, the communication device may operate in the target IoT mode. When the test is not satisfied, the communication device may operate in the source IoT mode or a second target IoT mode.

When switching to the target IoT mode, the communication device may monitor a paging message in the target IoT mode after the RRC connection release.

In addition to the above-described operation of FIG. 11 one or more of the operations described before with reference to FIGS. 1 to 10 may further be performed in combination.

Example of Communication System to which the Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 12 illustrates a communication system 1 applied to the present disclosure.

Referring to FIG. 12, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Example of Wireless Device to which the Present Disclosure is Applied

FIG. 13 illustrates wireless devices applicable to the present disclosure.

Referring to FIG. 13, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Example of Use of Wireless Device to which the Present Disclosure is Applied

FIG. 14 illustrates another example of a wireless device applied to the present disclosure. The wireless device may be implemented in various forms according to a use case/service (refer to FIG. 12).

Referring to FIG. 14, wireless devices 100 and 200 may correspond to the wireless devices 100 and 200 of FIG. 13 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100*a* of FIG. 12), the vehicles (100*b*-1 and 100*b*-2 of FIG. 12), the XR device (100*c* of FIG. 12), the hand-held device (100*d* of FIG. 12), the home appliance (100*e* of FIG. 12), the IoT device (100*f* of FIG. 12), a digital broadcasting terminal, a hologram device, a public safety device, an MTC device, a medical device, a FinTech device (or a finance device), a security device, a climate/environment device, the AI server/device (400 of FIG. 12), the BSs (200 of FIG. 12), a network node, or the like. The wireless device may be mobile or fixed according to a use case/service.

In FIG. 14, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Example of Vehicle or Autonomous Driving Vehicle to which the Present Disclosure is Applied FIG. 15 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 15, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

As described above, the present disclosure is applicable to various wireless communication systems.

The invention claimed is:

1. A method performed by a communication device in a wireless communication system, the method comprising:
    transmitting a radio resource control (RRC) connection release request message including information about at least one preferred target Internet of things (IoT) mode;
    receiving a RRC connection release message including information about a target IoT mode based on the RRC connection release request message; and
    releasing an RRC connection based on the RRC connection release message,
    wherein the communication device switches from a source IoT mode to the target IoT mode based on the information about the target IoT mode and the target IoT mode is determined based on the information about the at least one preferred target IoT mode.

2. The method according to claim 1, wherein the communication device switches from the source IoT mode to the target IoT mode simultaneously with the release of the RRC connection or at a time within a predetermined period from a time when the RRC connection release message is received.

3. The method according to claim 1, wherein information about at least one parameter for operation in the target IoT mode is received in an RRC configuration message before the release of the RRC connection or in the RRC connection release message.

4. The method according to claim 1, wherein the communication device monitors a paging message based on the target IoT mode after the release of the RRC connection.

5. The method according to claim 1, wherein the communication device tests whether operation in the target IoT mode satisfies a predetermined condition, before the release of the RRC connection.

6. A communication device operating in a wireless communication system, the communication device comprising:
    at least one transceiver;
    at least one processor; and
    at least one memory operatively coupled to the at least one processor and storing instructions which when executed, cause the at least one processor to perform specific operations,
    wherein the specific operations include:
    transmitting a radio resource control (RRC) connection release request message including information about at least one preferred target Internet of things (IoT) mode;
    receiving a RRC connection release message including information about a target IoT mode based on the RRC connection release request message; and
    releasing an RRC connection based on the RRC connection release message,
    wherein the communication device switches from a source IoT mode to the target IoT mode based on the information about the target IoT mode and the target IoT mode is determined based on the information about the at least one preferred target IoT mode.

7. The communication device according to claim 6, wherein the communication device switches from the source IoT mode to the target IoT mode simultaneously with the release of the RRC connection or at a time within a predetermined period from a time when the RRC connection release message is received.

8. The communication device according to claim 6, wherein information about at least one parameter for operation in the target IoT mode is received in an RRC configuration message before the release of the RRC connection or in the RRC connection release message.

9. The communication device according to claim 6, wherein the communication device monitors a paging message based on the target IoT mode after the release of the RRC connection.

10. The communication device according to claim 6, wherein the communication device tests whether operation in the target IoT mode satisfies a predetermined condition, before the release of the RRC connection.

11. The communication device according to claim 6, wherein the communication device includes an autonomous driving vehicle communicable with at least a user equipment (UE), a network, and another autonomous driving vehicle other than the communication device.

* * * * *